(12) United States Patent
Bari et al.

(10) Patent No.: US 12,293,366 B2
(45) Date of Patent: *May 6, 2025

(54) SYSTEM, METHOD, AND COMPUTER PROGRAM PRODUCT FOR REAL-TIME AUTOMATIC AUTHORIZATION OF A PAYMENT TRANSACTION

(71) Applicant: Visa International Service Association, San Francisco, CA (US)

(72) Inventors: Emese Bari, San Jose, CA (US); Jiri Medlen, Fullerton, CA (US); Ramkumar Jambunathan, San Jose, CA (US)

(73) Assignee: Visa International Service Association, San Francisco, CA (US)

( * ) Notice: Subject to any disclaimer, the term of this patent is extended or adjusted under 35 U.S.C. 154(b) by 50 days.

This patent is subject to a terminal disclaimer.

(21) Appl. No.: 18/111,919

(22) Filed: Feb. 21, 2023

(65) Prior Publication Data

US 2023/0206239 A1 Jun. 29, 2023

Related U.S. Application Data

(63) Continuation of application No. 17/279,620, filed as application No. PCT/US2018/053874 on Oct. 2, 2018, now Pat. No. 11,615,417.

(51) Int. Cl.
*G06Q 20/40* (2012.01)
(52) U.S. Cl.
CPC ... *G06Q 20/40145* (2013.01); *G06Q 20/4015* (2020.05)

(58) Field of Classification Search
CPC .................................. G06Q 20/40145
See application file for complete search history.

(56) References Cited

U.S. PATENT DOCUMENTS 6,522,772 B1 * 2/2003 Morrison ................. G07G 1/12
235/383
9,898,788 B1 2/2018 Calargun et al.
10,303,869 B1 * 5/2019 Duke ...................... G06F 21/36
(Continued)

OTHER PUBLICATIONS

Promontory et al., "Biometric Authentication in Payments", Nov. 2017, 42 pages, retrieved from http://www.promontory.com/uploadedFiles/Articles/Insights/Biometric_Authentication_Payments_REPORT.pdf.

*Primary Examiner* — Asha Puttaiah
(74) *Attorney, Agent, or Firm* — The Webb Law Firm

(57) ABSTRACT

Provided is a computer-implemented method for real-time automatic authorization of a payment transaction that is independent of an authorization input from a consumer. The method may include receiving first data associated with a consumer, generating a payment transaction classification model based on the first data associated with the consumer, receiving second data associated with the consumer, determining whether to process a payment transaction in real-time between the consumer and a merchant independent of an authorization input received from the consumer using the payment transaction classification model and the second data associated with the consumer, and processing a payment transaction between the consumer and the merchant based on determining to process the payment transaction in real-time between the consumer and the merchant.

17 Claims, 5 Drawing Sheets

(56) References Cited

U.S. PATENT DOCUMENTS

| | | | |
|---|---|---|---|
| 10,602,930 B2* | 3/2020 | Lawrence | A61B 5/749 |
| 10,853,800 B1 | 12/2020 | Meyer et al. | |
| 11,204,991 B1 | 12/2021 | Giraud | |
| 2006/0095369 A1 | 5/2006 | Hofi | |
| 2012/0198328 A1 | 8/2012 | Kiley et al. | |
| 2013/0046691 A1 | 2/2013 | Culton | |
| 2013/0198019 A1 | 8/2013 | Smith | |
| 2014/0279465 A1 | 9/2014 | Capps | |
| 2015/0088755 A1 | 3/2015 | Sobel et al. | |
| 2015/0095190 A1 | 4/2015 | Hammad et al. | |
| 2015/0120547 A1 | 4/2015 | Ghosh et al. | |
| 2016/0283703 A1* | 9/2016 | Allyn | H04L 63/0861 |
| 2017/0163655 A1* | 6/2017 | Ramalingam | G06Q 30/0239 |
| 2018/0082356 A1* | 3/2018 | Wilkinson | G06Q 10/083 |

* cited by examiner

SYSTEM, METHOD, AND COMPUTER PROGRAM PRODUCT FOR REAL-TIME AUTOMATIC AUTHORIZATION OF A PAYMENT TRANSACTION

CROSS REFERENCE TO RELATED APPLICATIONS

This application is a continuation application of U.S. patent application Ser. No. 17/279,620 filed Oct. 2, 2018, which is the United States national phase of International Application No. PCT/US2018/053874 filed Oct. 2, 2018, the disclosures of which are hereby incorporated by reference in their entirety.

BACKGROUND

1. Technical Field

This disclosure relates generally to systems, devices, products, apparatus, and methods that are used for real-time automatic authorization of a payment transaction, and in non-limiting embodiments, to a system, product, and method for real-time automatic authorization of a payment transaction that is independent of an authorization input from a consumer.

2. Technical Considerations

A direct withdrawal may include a financial transaction (e.g., a payment transaction) in which a financial institution withdraws funds from a customer's account (e.g., a credit account, a debit account, and/or the like). For example, a direct withdrawal may include a payment transaction in which an acquirer bank of a merchant withdraws funds from a customer's account based on the customer providing pre-authorization for the payment transaction, at a time prior to the payment transaction, which authorizes the acquirer bank of the merchant to withdraw funds from the customer's account. In such an example, the customer may not provide authorization for the payment transaction in real-time since the customer provided pre-authorization for the payment transaction.

In some instances, a direct withdrawal may be used for a recurring payment transaction, such as when a customer provides a payment (e.g., an electronic bill payment) for a recurring utility bill. When the pre-authorization has been provided by the customer, the circumstances in which the funds are drawn, as well as the dates and amounts, are a matter of agreement between the customer and the merchant to which the payment is provided. In addition, the customer may be able to cancel the pre-authorization for a direct withdrawal and/or the banker can decline to carry out a debit if the transaction would breach the terms of the bank account out of which payment is to be made, for example, if it were to cause the account to overdraw.

However, a customer may not be able to provide pre-authorization for a payment transaction in real-time. For example, a customer may conduct a payment transaction with a merchant on a regular basis by going to a location of the merchant and conducting the payment transaction involving a good provided by the merchant. In another example, the customer may conduct a payment transaction with the merchant on a regular basis by making a telephone order by calling the merchant or making an online order through a website of the merchant and conducting a payment transaction involving a good provided by the merchant. In either example above, the customer may have to provide an authorization for the payment transaction in real-time. In this way, the customer may have to spend time traveling to the location of the merchant and/or making the telephone order or the online order to the merchant to provide the authorization for the payment transaction.

SUMMARY

Accordingly, improved systems, devices, products, apparatus, and/or methods for real-time automatic authorization of a payment transaction that is independent of an authorization input from a consumer are disclosed.

According to some non-limiting embodiments, provided is a method for real-time automatic authorization of a payment transaction that is independent of an authorization input from a consumer. The method comprises receiving, with at least one processor, first data associated with a consumer, wherein the first data associated with the consumer comprises: transaction data associated with a plurality of payment transactions conducted by the consumer, and biometric data associated with a plurality of biometric measurements of the consumer, wherein each of biometric measurements is taken within a predetermined time interval associated with each payment transaction of the plurality of payment transactions; generating, with at least one processor, a payment transaction classification model based on the transaction data associated with a plurality of payment transactions conducted by the consumer and the biometric data associated with the plurality of biometric measurements of the consumer; and receiving, with at least one processor, second data associated with the consumer during a time interval, wherein the second data associated with the consumer comprises: location data associated with a location of the consumer during the time interval, biometric data associated with a biometric measurement of the consumer during the time interval, determining, with at least one processor, whether to process a payment transaction in real-time between the consumer and the merchant independent of an authorization input received from the consumer using the payment transaction classification model and the second data associated with the consumer; and processing, with at least one processor, a payment transaction between the consumer and the merchant associated with a merchant location independent of an authorization input received from the consumer based on determining to process the payment transaction in real-time between the consumer and the merchant.

According to some non-limiting embodiments, provided is a system for real-time automatic authorization of a payment transaction that is independent of an authorization input from a consumer. The system comprises at least one processor programmed or configured to at least one processor programmed or configured to: receive first data associated with a consumer, wherein the first data associated with the consumer comprises: transaction data associated with a plurality of payment transactions conducted by the consumer, and biometric data associated with a plurality of biometric measurements of the consumer, wherein each of biometric measurements is taken within a time interval associated with each payment transaction of the plurality of payment transactions; generate a payment transaction classification model based on the transaction data associated with a plurality of payment transactions conducted by the consumer and the biometric data associated with the plurality of biometric measurements of the consumer; and receive second data associated with the consumer, wherein the second data associated with the consumer comprises biometric data associated with a biometric measurement of the consumer, determine whether to process a payment transaction in real-time between the consumer and a merchant independent of an authorization input received from the consumer using the payment transaction classification model and the second data associated with the consumer; and process the payment transaction in real-time between the consumer and the merchant based on determining to process the payment transaction in real-time between the consumer and the merchant.

According to some non-limiting embodiments, provided is a computer program product for real-time automatic authorization of a payment transaction that is independent of an authorization input from a consumer. The computer program product comprises at least one non-transitory computer-readable medium including one or more instructions that, when executed by at least one processor, cause the at least one processor to receive first data associated with a consumer, wherein the first data associated with the consumer comprises: transaction data associated with a plurality of payment transactions conducted by the consumer, and biometric data associated with a plurality of biometric measurements of the consumer, wherein each of biometric measurements is taken within a time interval associated with each payment transaction of the plurality of payment transactions; generate a payment transaction classification model based on the transaction data associated with a plurality of payment transactions conducted by the consumer and the biometric data associated with the plurality of biometric measurements of the consumer; receive second data associated with the consumer, wherein the second data associated with the consumer comprises: location data associated with a location of the consumer during a predetermined time interval, and biometric data associated with a biometric measurement of the consumer during the predetermined time interval; determine whether to process a payment transaction in real-time between the consumer and a merchant independent of an authorization input received from the consumer using the payment transaction classification model and the second data associated with the consumer; and process the payment transaction in real-time between the consumer and the merchant based on determining to process the payment transaction in real-time between the consumer and the merchant.

Further non-limiting embodiments or aspects are set forth in the following numbered clauses:

Clause 1: A method for real-time automatic authorization of a payment transaction that is independent of an authorization input from a consumer, the method comprising: receiving, with at least one processor, first data associated with a consumer, wherein the first data associated with the consumer comprises: transaction data associated with a plurality of payment transactions conducted by the consumer, and the biometric data associated with a plurality of biometric measurements of the consumer, wherein each of the biometric measurements is taken within a predetermined time interval associated with each payment transaction of the plurality of payment transactions; generating, with at least one processor, a payment transaction classification model based on the transaction data associated with a plurality of payment transactions conducted by the consumer and the biometric data associated with the plurality of biometric measurements of the consumer; and receiving, with at least one processor, second data associated with the consumer during a time interval, wherein the second data associated with the consumer comprises: location data associated with a location of the consumer during the time interval, biometric data associated with a biometric measurement of the consumer during the time interval, determining, with at least one processor, whether to process a payment transaction in real-time between the consumer and a merchant independent of an authorization input received from the consumer using the payment transaction classification model and the second data associated with the consumer; and processing, with at least one processor, a payment transaction between the consumer and the merchant associated with a merchant location independent of an authorization input received from the consumer based on determining to process the payment transaction in real-time between the consumer and the merchant.

Clause 2: The method of clause 1, further comprising: determining that the location data associated with the location of the consumer during the time interval satisfies a threshold value of distance associated with the merchant location of the merchant; and determining that the biometric data associated with the biometric measurement of the consumer during the time interval satisfies a threshold value of the biometric measurement of the consumer.

Clause 3: The method of clause 1 or 2, further comprising: determining an identity of the merchant associated with the merchant location; and communicating an order of a product to the merchant based on determining the identity of the merchant associated with the merchant location.

Clause 4: The method of any of clauses 1-3, wherein communicating the order of the product to the merchant comprises: communicating the order of the product to the merchant during the time interval based on the data associated with the biometric measurement of the consumer during the time interval.

Clause 5: The method of any of clauses 1-4, wherein the biometric data associated with the plurality of biometric measurements of the consumer comprises data associated with a blood sugar level of the consumer, and wherein receiving the second data associated with the consumer during the time interval comprises: receiving data associated with the blood sugar level of the consumer during the time interval from a mobile device associated with the consumer.

Clause 6: The method of any of clauses 1-5, wherein the transaction data associated with a plurality of payment transactions conducted by the consumer comprises at least one of the following: merchant category data associated with a merchant category of a merchant involved in a payment transaction of the plurality of payment transactions conducted by the consumer; product identification data associated with an identifier of a product involved in a payment transaction of the plurality of payment transactions conducted by the consumer; location data associated with a merchant location associated with a merchant involved in a payment transaction of the plurality of payment transactions conducted by the consumer; or any combination thereof.

Clause 7: The method of any of clauses 1-6, further comprising: determining a distance of the consumer from the merchant location of the merchant; determining an estimated time of arrival of the consumer at the merchant location based on the distance of the consumer from the merchant location, wherein processing the payment transaction in real-time between the consumer and the merchant associated with the merchant location independent of the input received from the consumer comprises: processing the payment transaction in real-time between the consumer and the merchant associated with the merchant location based on the estimated time of arrival of the consumer at the merchant location.

Clause 8: The method of any of clauses 1-7, wherein the second data associated with the consumer during the time interval comprises calendar data associated with a calendar application of the consumer, and wherein determining whether to process the payment transaction in real-time between the consumer and the merchant comprises: determining whether the calendar data associated with the calendar application of the consumer indicates that the consumer is to be within a threshold value of a distance associated with the merchant location during the time interval.

Clause 9: A system for real-time automatic authorization of a payment transaction that is independent of an authorization input from a consumer, the system comprising: at least one processor programmed or configured to: receive first data associated with a consumer, wherein the first data associated with the consumer comprises: transaction data associated with a plurality of payment transactions conducted by the consumer; and the biometric data associated with a plurality of biometric measurements of the consumer, wherein each of the biometric measurements is taken within a time interval associated with each payment transaction of the plurality of payment transactions; generate a payment transaction classification model based on the transaction data associated with a plurality of payment transactions conducted by the consumer and the biometric data associated with the plurality of biometric measurements of the consumer; receive second data associated with the consumer, wherein the second data associated with the consumer comprises biometric data associated with a biometric measurement of the consumer; determine whether to process a payment transaction in real-time between the consumer and a merchant independent of an authorization input received from the consumer using the payment transaction classification model and the second data associated with the consumer; and process the payment transaction in real-time between the consumer and the merchant based on determining to process the payment transaction in real-time between the consumer and the merchant.

Clause 10: The system of clause 9, wherein the second data associated with the consumer comprises location data associated with a location of the consumer, and wherein the at least one processor is further programmed or configured to: determine that the location data associated with the location of the consumer during a time interval satisfies a threshold value of distance associated with a merchant location of the merchant; and determine that the biometric data associated with the biometric measurement of the consumer during the time interval satisfies a threshold value of the biometric measurement of the consumer.

Clause 11: The system of clause 9 or 10, wherein the at least one processor is further programmed or configured to: determine an identity of the merchant associated with the merchant location; and communicate an order of a product to the merchant during the predetermined time interval based on determining the identity of the merchant associated with the merchant location.

Clause 12: The system of any of clauses 9-11, wherein, when communicating the order of the product to the merchant during the predetermined time interval, the at least one processor is programmed or configured to: communicate an order of a product to the merchant during the predetermined time interval based on the data associated with the biometric measurement of the consumer during the time interval.

Clause 13: The system of any of clauses 9-12, wherein the biometric data associated with the plurality of biometric measurements of the consumer comprises data associated with a blood sugar level of the consumer, and wherein, when receiving the second data associated with the consumer, the at least one processor is programmed or configured to: receive data associated with the blood sugar level of the consumer during a time interval from a mobile device associated with the consumer.

Clause 14: The system of any of clauses 9-13, wherein the at least one processor is further programmed or configured to: determine a distance of the consumer from a merchant location of the merchant; determine an estimated time of arrival of the consumer at the merchant location based on the distance of the consumer from the merchant location; and wherein, when processing the payment transaction in real-time between the consumer and the merchant, the at least one processor is programmed or configured to: process the payment transaction in real-time between the consumer and the merchant associated with the merchant location based on the estimated time of arrival of the consumer at the merchant location.

Clause 15: The system of any of clauses 9-14, wherein the second data associated with the consumer comprises calendar data associated with a calendar application of the consumer, and wherein, when determining whether to process the payment transaction in real-time between the consumer and the merchant, the at least one processor is programmed or configured to: determine whether the calendar data associated with the calendar application of the consumer indicates that the consumer is to be within a threshold value of the distance associated with the merchant location during the time interval.

Clause 16: A computer program product for real-time automatic authorization of a payment transaction that is independent of an authorization input from a consumer, the computer program product comprising at least one non-transitory computer-readable medium including one or more instructions that, when executed by at least one processor, cause the at least one processor to: receive first data associated with a consumer, wherein the first data associated with the consumer comprises: transaction data associated with a plurality of payment transactions conducted by the consumer, and biometric data associated with a plurality of biometric measurements of the consumer, wherein each of the biometric measurements is taken within a time interval associated with each payment transaction of the plurality of payment transactions; generate a payment transaction classification model based on the transaction data associated with a plurality of payment transactions conducted by the consumer and the biometric data associated with the plurality of biometric measurements of the consumer; receive second data associated with the consumer, wherein the second data associated with the consumer comprises: location data associated with a location of the consumer during a time interval, and biometric data associated with a biometric measurement of the consumer during the time interval; determine whether to process a payment transaction in real-time between the consumer and a merchant independent of an input received from the consumer using the payment transaction classification model and the second data associated with the consumer; and process the payment transaction in real-time between the consumer and the merchant based on determining to process the payment transaction in real-time between the consumer and the merchant.

Clause 17: The computer program product of clause 16, wherein the one or more instructions further cause the at least one processor to: determine that the location data associated with the location of the consumer during a time interval satisfies a threshold value of distance associated with a merchant location of the merchant; and determine that the biometric data associated with the biometric measurement of the consumer during the time interval satisfies a threshold value of the biometric measurement of the consumer.

Clause 18: The computer program product of clause 16 or 17, wherein the one or more instructions further cause the at least one processor to: determine an identity of the merchant; and communicate an order of a product to the merchant during the predetermined time interval based on determining the identity of the merchant associated with the merchant location.

Clause 19: The computer program product of any of clauses 16-18, wherein the one or more instructions that cause the at least one processor to communicate the order of the product to the merchant during the predetermined time interval, cause the at least one processor to: communicate an order of a product to the merchant during the predetermined time interval based on the data associated with the biometric measurement of the consumer during the time interval.

Clause 20: The computer program product of any of clauses 16-19, wherein the one or more instructions further cause the at least one processor to: determine a distance of the consumer from a merchant location of the merchant; determine an estimated time of arrival of the consumer at the merchant location based on the distance of the consumer from the merchant location; and wherein, the one or more instructions that cause the at least one processor to process the payment transaction in real-time between the consumer and the merchant, cause the at least one processor to: process the payment transaction in real-time between the consumer and the merchant associated with the merchant location based on the estimated time of arrival of the consumer at the merchant location.

Clause 21: A method for real-time automatic authorization of a payment transaction that is independent of an authorization input from a consumer, the method comprising: receiving, with at least one processor, first data associated with a consumer, wherein the first data associated with the consumer comprises: data associated with a smart container of the consumer during a plurality of time intervals; schedule data associated with a schedule of the consumer during the plurality of time intervals; and transaction data associated with a plurality of payment transactions conducted by the consumer involving contents of the smart container; generating, with at least one processor, a payment transaction classification model based on the data associated with a smart container of the consumer during the plurality of time intervals, the schedule data associated with a schedule of the consumer during the plurality of time intervals, and the transaction data associated with the plurality of payment transactions conducted by the consumer involving contents of the smart container; and receiving, with at least one processor, second data associated with the consumer during a predetermined time interval, wherein the second data associated with the consumer comprises: smart container data associated with the smart container of the consumer during the predetermined time interval; and schedule data associated with a schedule of the consumer during the predetermined time interval, determining, with at least one processor, whether to process a payment transaction in real-time between the consumer and the merchant independent of an authorization input received from the consumer using the payment transaction classification model and the second data associated with the consumer; and processing, with at least one processor, the payment transaction in real-time between the consumer and the merchant based on determining to process the payment transaction in real-time between the consumer and the merchant.

Clause 22: The method of clause 21, further comprising: determining that the smart container data associated with the smart container of the consumer during the predetermined time interval satisfies a threshold value of content associated with a smart container; and determining that the schedule data associated with the schedule of the consumer during the predetermined time interval satisfies a threshold value of time associated with the schedule of the consumer.

Clause 23: The method of clause 21 or 22, further comprising: determining an identity of the merchant that provides a product associated with the contents of the smart container; and communicating an order of the product associated with the contents of the smart container to the merchant based on determining the identity of the merchant.

Clause 24: The method of any of clauses 21-23, wherein communicating the order of the product associated with the contents of the smart container to the merchant comprises: communicating the order of the product to the merchant during the time interval based on the smart container data associated with the smart container of the consumer.

Clause 25: The method of any of clauses 21-24, wherein the smart container data associated with the smart container of the consumer comprises data associated with an amount of contents of the smart container of the consumer, and wherein receiving the second data associated with the consumer during the time interval comprises: receiving the data associated with an amount of contents of the smart container of the consumer from a user device associated with the smart container.

Clause 26: The method of any of clauses 21-25, further comprising: determining an amount of time between the predetermined time interval and a future time interval associated with the consumer; determining whether the consumer is to be present at a location associated with the smart container based on the schedule data associated with the schedule of the consumer during the predetermined time interval, wherein processing the payment transaction in real-time between the consumer and the merchant independent of an authorization input received from the consumer comprises: processing the payment transaction in real-time between the consumer and the merchant associated with the merchant location based on determining that the consumer is to be present at the location associated with the smart container during the amount of time between the predetermined time interval and the future time interval associated with the consumer.

Clause 27: The method of any of clauses 21-26, wherein the smart container data associated with the smart container of the consumer during the predetermined time interval comprises: data associated with an average consumption of contents of the smart container; and data associated with an amount of contents of the smart container of the consumer; the method further comprising: determining an estimated time interval at which contents of the smart container of the consumer satisfy a threshold value associated with the amount of contents of the smart container based on the data associated with an average consumption of contents of the smart container and the data associated with an amount of contents of the smart container of the consumer; and wherein determining whether to process the payment transaction in real-time between the consumer and the merchant independent of an authorization input received from the consumer comprises: determining whether to process the payment transaction in real-time between the consumer and the merchant independent of an authorization input received from the consumer based on the estimated time interval at which the contents of the smart container of the consumer satisfy the threshold value associated with the amount of contents of the smart container.

Clause 28: A system for real-time automatic authorization of a payment transaction that is independent of an authorization input from a consumer, the system comprising: at least one processor programmed or configured to: receive first data associated with a consumer, wherein the first data associated with the consumer comprises: data associated with a smart container of the consumer during a plurality of time intervals, schedule data associated with a schedule of the consumer during the plurality of time intervals, and transaction data associated with a plurality of payment transactions conducted by the consumer involving contents of the smart container; generate a payment transaction classification model based on the data associated with a smart container of the consumer during the plurality of time intervals; the schedule data associated with a schedule of the consumer during the plurality of time intervals, and the transaction data associated with the plurality of payment transactions conducted by the consumer involving contents of the smart container; and receive second data associated with the consumer during a predetermined time interval, wherein the second data associated with the consumer comprises: smart container data associated with the smart container of the consumer during the predetermined time interval; and schedule data associated with the schedule of the consumer during the predetermined time interval; determine whether to process a payment transaction in real-time between the consumer and the merchant independent of an authorization input received from the consumer using the payment transaction classification model and the second data associated with the consumer; and process the payment transaction in real-time between the consumer and the merchant based on determining to process the payment transaction in real-time between the consumer and the merchant.

Clause 29: The system of clause 28, wherein the at least one processor is further programmed or configured to: determine that the smart container data associated with the smart container of the consumer during the predetermined time interval satisfies a threshold value of content associated with a smart container; and determine that the schedule data associated with the schedule of the consumer during the predetermined time interval satisfies a threshold value of time associated with the schedule of the consumer.

Clause 30: The system of clause 28 or 29, wherein the at least one processor is further programmed or configured to: determine an identity of the merchant that provides a product associated with the contents of the smart container; and communicate an order of the product associated with the contents of the smart container to the merchant based on determining the identity of the merchant.

Clause 31: The system of any of clauses 28-30, wherein, when communicating the order of the product to the merchant, the at least one processor is programmed or configured to: communicate the order of the product to the merchant during the predetermined time interval based on the smart container data associated with the smart container of the consumer.

Clause 32: The system of any of clauses 28-31, wherein the smart container data associated with the smart container of the consumer comprises data associated with an amount of contents of the smart container of the consumer, and wherein, when receiving the second data associated with the consumer during the predetermined time interval, the at least one processor is programmed or configured to: receive the data associated with an amount of contents of the smart container of the consumer from a user device associated with the smart container.

Clause 33: The system of any of clauses 28-32, wherein the at least one processor is further programmed or configured to: determine an amount of time between the predetermined time interval and a future time interval associated with the consumer; determine whether the consumer is to be present at a location associated with the smart container based on the schedule data associated with the schedule of the consumer during the predetermined time interval; and wherein, when processing the payment transaction in real-time between the consumer and the merchant independent of an authorization input received from the consumer, the at least one processor is programmed or configured to: process the payment transaction in real-time between the consumer and the merchant associated with the merchant location based on determining that the consumer is to be present at the location associated with the smart container during the amount of time between the predetermined time interval and the future time interval associated with the consumer.

Clause 34: The system of any of clauses 28-33, wherein the smart container data associated with the smart container of the consumer during the predetermined time interval comprises: data associated with an average consumption of contents of the smart container, and data associated with an amount of contents of the smart container of the consumer; and wherein the at least one processor is further programmed or configured to: determine an estimated time interval at which contents of the smart container of the consumer satisfy a threshold value associated with the amount of contents of the smart container based on the data associated with an average consumption of contents of the smart container and the data associated with an amount of contents of the smart container of the consumer; and wherein, when determining whether to process the payment transaction in real-time between the consumer and the merchant independent of an authorization input received from the consumer, the at least one processor is programmed or configured to: determine whether to process the payment transaction in real-time between the consumer and the merchant independent of an authorization input received from the consumer based on the estimated time interval at which the contents of the smart container of the consumer satisfy the threshold value associated with the amount of contents of the smart container.

Clause 35: A computer program product for real-time automatic authorization of a payment transaction that is independent of an authorization input from a consumer, the computer program product comprising at least one non-transitory computer-readable medium including one or more instructions that, when executed by at least one processor, cause the at least one processor to: receive first data associated with a consumer, wherein the first data associated with the consumer comprises: data associated with the smart container of the consumer during a plurality of time intervals, schedule data associated with the schedule of the consumer during the plurality of time intervals, and transaction data associated with a plurality of payment transactions conducted by the consumer involving contents of the smart container; generate a payment transaction classification model based on the data associated with a smart container of the consumer during the plurality of time intervals; the schedule data associated with the schedule of the consumer during the plurality of time intervals; and the transaction data associated with the plurality of the payment transactions conducted by the consumer involving contents of the smart container; and receive second data associated with the consumer during a predetermined time interval, wherein the second data associated with the consumer comprises: smart container data associated with the smart container of the consumer during the predetermined time interval, and schedule data associated with a schedule of the consumer during the predetermined time interval; determine whether to process the payment transaction in real-time between the consumer and the merchant independent of the authorization input received from the consumer using the payment transaction classification model and the second data associated with the consumer; and process the payment transaction in real-time between the consumer and the merchant based on determining to process the payment transaction in real-time between the consumer and the merchant.

Clause 36: The computer program product of clause 35, wherein the one or more instructions further cause the at least one processor to: determine that the smart container data associated with the smart container of the consumer during the predetermined time interval satisfies a threshold value of content associated with the smart container; and determine that the schedule data associated with the schedule of the consumer during the predetermined time interval satisfies a threshold value of time associated with the schedule of the consumer.

Clause 37: The computer program product of clause 35 or 36, wherein the one or more instructions further cause the at least one processor to: determine an identity of the merchant that provides a product associated with the contents of the smart container; and communicate an order of the product associated with the contents of the smart container to the merchant based on determining the identity of the merchant.

Clause 38: The computer program product of any of clauses 35-37, wherein the one or more instructions that cause the at least one processor to communicate the order of the product to the merchant, cause the at least one processor to: communicate the order of the product to the merchant during the predetermined time interval based on the smart container data associated with the smart container of the consumer.

Clause 39: The computer program product of any of clauses 35-38, wherein the one or more instructions further cause the at least one processor to: determine an amount of time between the predetermined time interval and a future time interval associated with the consumer; determine whether the consumer is to be present at a location associated with the smart container based on the schedule data associated with the schedule of the consumer during the predetermined time interval; and wherein, the one or more instructions that cause the at least one processor to process the payment transaction in real-time between the consumer and the merchant independent of the authorization input received from the consumer, cause the at least one processor to: process the payment transaction in real-time between the consumer and the merchant associated with the merchant location based on determining that the consumer is to be present at the location associated with the smart container during the amount of time between the predetermined time interval and the future time interval associated with the consumer.

Clause 40: The computer program product of any of clauses 35-39, wherein the smart container data associated with the smart container of the consumer during the predetermined time interval comprises: data associated with an average consumption of contents of the smart container; and data associated with an amount of contents of the smart container of the consumer; and wherein the one or more instructions further cause the at least one processor to: determine an estimated time interval at which contents of the smart container of the consumer satisfy a threshold value associated with the amount of contents of the smart container based on the data associated with an average consumption of contents of the smart container and the data associated with an amount of contents of the smart container of the consumer; and wherein, the one or more instructions that cause the at least one processor to determine whether to process the payment transaction in real-time between the consumer and the merchant independent of an authorization input received from the consumer, cause the at least one processor to: determine whether to process the payment transaction in real-time between the consumer and the merchant independent of an authorization input received from the consumer based on the estimated time interval at which the contents of the smart container of the consumer satisfy the threshold value associated with the amount of contents of the smart container.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and the claims, the singular form of "a," "an," and "the" include plural referents unless the context clearly dictates otherwise.

BRIEF DESCRIPTION OF THE DRAWINGS

Additional advantages and details of the disclosure are explained in greater detail below with reference to the exemplary embodiments that are illustrated in the accompanying schematic figures, in which.

DESCRIPTION

Figure 1:
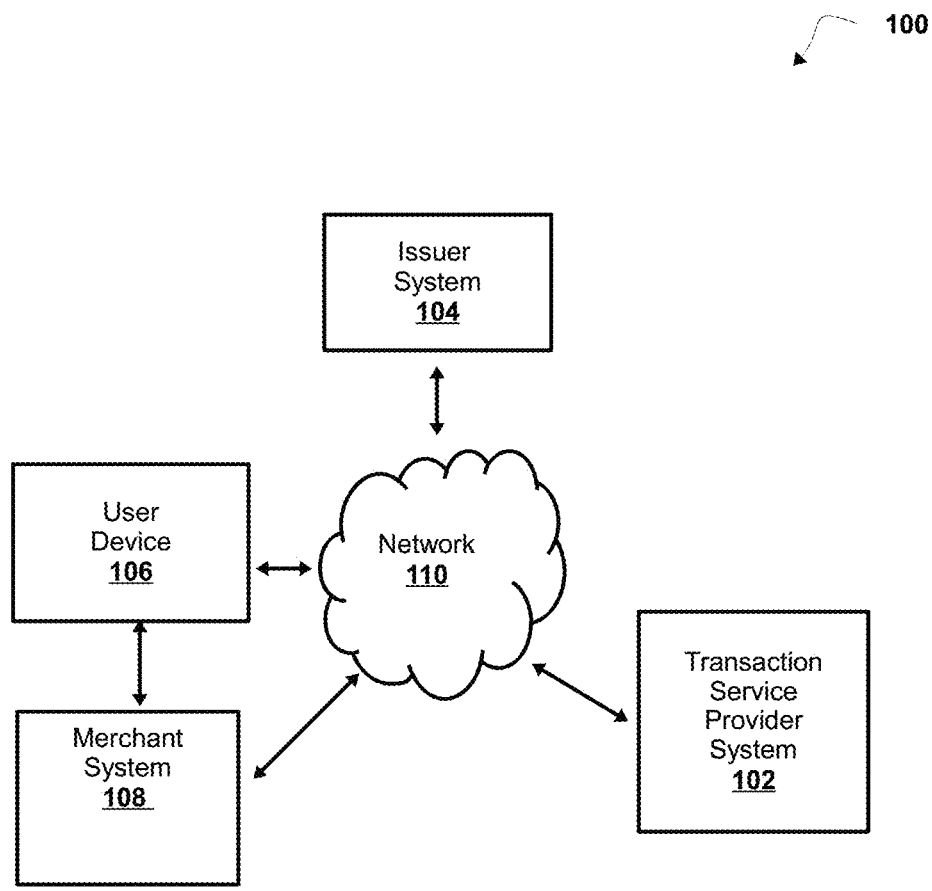
FIG. 1 is a diagram of some non-limiting embodiments of an environment in which systems, devices, products, apparatus, and/or methods, described herein, may be implemented according to the principles of the present disclosure.

For purposes of the description hereinafter, the terms "end," "upper," "lower," "right," "left," "vertical," "horizontal," "top," "bottom," "lateral," "longitudinal," and derivatives thereof shall relate to the disclosure as it is oriented in the drawing figures. However, it is to be understood that the disclosure may assume various alternative variations and step sequences, except where expressly specified to the contrary. It is also to be understood that the specific devices and processes illustrated in the attached drawings, and described in the following specification, are simply exemplary embodiments or aspects of the disclosure. Hence, specific dimensions and other physical characteristics related to the embodiments or aspects of the embodiments disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to include one or more items, and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

Some non-limiting embodiments are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, and/or the like.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments, a message may refer to a network packet (e.g., a data packet and/or the like) that includes data. It will be appreciated that numerous other arrangements are possible.

As used herein, the terms "issuer institution," "portable financial device issuer," "issuer," or "issuer bank" may refer to one or more entities that provide one or more accounts to a user (e.g., customer, consumer, and/or the like) for conducting transactions (e.g., payment transactions), such as initiating credit card payment transactions and/or debit card payment transactions. For example, an issuer institution may provide an account identifier, such as a personal account number (PAN), to a user that uniquely identifies one or more accounts associated with that user. The account identifier may be embodied on a portable financial device, such as a physical financial instrument (e.g., a payment card) and/or may be electronic and used for electronic payments. In some non-limiting embodiments, an issuer institution may be associated with a bank identification number (BIN) that uniquely identifies the issuer institution. As used herein "issuer institution system" may refer to one or more computer systems operated by or on behalf of an issuer institution, such as a server computer executing one or more software applications. For example, an issuer institution system may include one or more authorization servers for authorizing a payment transaction.

As used herein, the term "account identifier" may refer to one or more types of identifiers associated with a user account (e.g., an account identifier, a PAN, a card number, a payment card number, a token, and/or the like). In some non-limiting embodiments, an issuer institution may provide an account identifier (e.g., a PAN, a token, and/or the like) to a user that uniquely identifies one or more accounts associated with that user. The account identifier may be embodied on a physical financial instrument (e.g., a portable financial instrument, a payment card, a credit card, a debit card, and/or the like) and/or may be electronic information communicated to the user that the user may use for electronic payment transactions. In some non-limiting embodiments, the account identifier may be an original account identifier, where the original account identifier was provided to a user at the creation of the account associated with the account identifier. In some non-limiting embodiments, the account identifier may be an account identifier (e.g., a supplemental account identifier) that is provided to a user after the original account identifier was provided to the user. For example, if the original account identifier is forgotten, stolen, and/or the like, a supplemental account identifier may be provided to the user. In some non-limiting embodiments, an account identifier may be directly or indirectly associated with an issuer institution such that an account identifier may be a token that maps to a PAN or other type of identifier. Account identifiers may be alphanumeric, any combination of characters and/or symbols, and/or the like.

As used herein, the term "token" may refer to an identifier that is used as a substitute or replacement identifier for an account identifier, such as a PAN. A token may be used as a substitute or replacement identifier for an original account identifier, such as a PAN. Tokens may be associated with a PAN or other original account identifiers in one or more data structures (e.g., one or more databases and/or the like) such that they may be used to conduct a transaction without directly using the original account identifier. In some non-limiting embodiments, an original account identifier, such as a PAN, may be associated with a plurality of tokens for different individuals or purposes. In some non-limiting embodiments, tokens may be associated with a PAN or other account identifiers in one or more data structures such that they can be used to conduct a transaction without directly using the account identifier, such as a PAN. In some examples, an account identifier, such as a PAN, may be associated with a plurality of tokens for different uses or different purposes.

As used herein, the term "merchant" may refer to one or more entities (e.g., operators of retail businesses) that provide goods and/or services, and/or access to goods and/or services, to a user based on a transaction, such as a payment transaction. As used herein "merchant system" may refer to one or more computer systems operated by or on behalf of a merchant, such as a server executing one or more software applications. As used herein, the term "product" may refer to one or more goods and/or services offered by a merchant.

As used herein, a "point-of-sale (POS) device" may refer to one or more devices, which may be used by a merchant to conduct a transaction (e.g., a payment transaction) and/or process a transaction. For example, a POS device may include one or more computers, peripheral devices, card readers, near-field communication (NFC) receivers, radio frequency identification (RFID) receivers, and/or other contactless transceivers or receivers, contact-based receivers, payment terminals, computers, servers, input devices, and/or the like.

As used herein, a "POS system" may refer to one or more computers and/or peripheral devices used by a merchant to conduct a transaction. For example, a POS system may include one or more POS devices and/or other like devices that may be used to conduct a payment transaction. A POS system (e.g., a merchant POS system) may also include one or more server computers programmed or configured to process online payment transactions through webpages, mobile applications, and/or the like.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network, such as Visa®, MasterCard®, American Express®, or any other entity that processes transactions. As used herein "transaction service provider system" may refer to one or more computer systems operated by or on behalf of a transaction service provider, such as a transaction service provider system executing one or more software applications. A transaction service provider system may include one or more processors and, in some non-limiting embodiments, may be operated by or on behalf of a transaction service provider.

As used herein, the term "portable financial device" may refer to a payment device, an electronic payment device, a payment card (e.g., a credit or debit card), a gift card, a smartcard, smart media, a payroll card, a healthcare card, a wristband, a machine-readable medium containing account information, a keychain device or fob, an radio frequency identification (RFID) transponder, a retailer discount or loyalty card, a cellular phone, an electronic wallet application, a personal digital assistant (PDA), a pager, a security card, a computer, an access card, a wireless terminal, and/or a transponder, as examples. The portable financial device may include volatile or non-volatile memory to store information (e.g., an account identifier, a name of the account holder, and/or the like).

As used herein, the terms "client" and "client device" may refer to one or more client-side devices or systems, remote from a transaction service provider, used to initiate or facilitate a transaction. As an example, a "client device" may refer to one or more POS devices and/or POS systems used by a merchant. It will be appreciated that a client device may be any electronic device configured to communicate with one or more networks and initiate or facilitate transactions such as, but not limited to, one or more computers, portable computers, tablet computers, cellular phones, wearable devices (e.g., watches, glasses, lenses, clothing, and/or the like), wearable devices that include one or more biometric sensors (e.g., one or more biometric sensors that sense a biometric measurement, one or more biometric sensors that sense a measurement of blood sugar of a user, and/or the like), appliances (e.g., one or more smart appliances, one or smart refrigerators that is able to communicate data associated with PDAs, and/or other like devices. Moreover, a "client" may also refer to an entity, such as a merchant, that owns, utilizes, and/or operates a client device for initiating transactions with a transaction service provider.

As used herein, the term "server" may refer to one or more computing devices, such as processors, storage devices, and/or similar computer components that communicate with client devices and/or other computing devices over a network, such as the Internet or private networks, and, in some examples, facilitate communication among other servers and/or client devices. It will be appreciated that various other arrangements are possible. As used herein, the term "system" may refer to one or more computing devices or combinations of computing devices such as, but not limited to, processors, servers, client devices, software applications, and/or other like components. In addition, reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

Non-limiting embodiments of the present disclosure are directed to systems, methods, and computer program products for real-time automatic authorization of a payment transaction that is independent of an authorization input from a consumer. In some non-limiting embodiments, a method may include receiving first data associated with a consumer. In some non-limiting embodiments, the first data associated with the consumer may include transaction data associated with a plurality of payment transactions conducted by the consumer, biometric data associated with a plurality of biometric measurements of the consumer, data associated with a smart container of the consumer during a plurality of time intervals, and/or schedule data associated with a schedule of the consumer during a plurality of time intervals. In some non-limiting embodiments, each of biometric measurements is taken within a predetermined time interval associated with each payment transaction of a plurality of payment transactions.

The method may further include generating a payment transaction classification model based on the first data associated with the consumer and receiving second data associated with the consumer during a time interval. In some non-limiting embodiments, the second data associated with the consumer may include location data associated with a location of the consumer during the time interval, biometric data associated with a biometric measurement of the consumer during the time interval, data associated with a smart container of the consumer during a time interval, and/or schedule data associated with a schedule of the consumer during a time interval.

The method may further include determining, with at least one processor, whether to process a payment transaction in real-time between the consumer and a merchant independent of an authorization input received from the consumer using the payment transaction classification model and the second data associated with the consumer and processing a payment transaction between the consumer and the merchant based on determining to process the payment transaction in real-time between the consumer and the merchant.

In this way, non-limiting embodiments of the present disclosure reduce an amount of time associated with processing a payment transaction as compared to an amount of time associated with processing a payment transaction where a customer may have to spend time traveling to a location of a merchant and/or making the telephone order or the online order to the merchant to provide the authorization for the payment transaction.

Referring now to FIG. 1, FIG. 1 is a diagram of an example environment 100 in which devices, systems, and/or methods, described herein, may be implemented. As shown in FIG. 1, environment 100 includes a transaction service provider system 102, an issuer system 104, a user device 106, a merchant system 108, and a network 110. Transaction service provider system 102, issuer system 104, user device 106, and/or merchant system 108 may interconnect (e.g., establish a connection to communicate) via wired connections, wireless connections, or a combination of wired and wireless connections.

Transaction service provider system 102 may include one or more devices capable of receiving information from issuer system 104, user device 106, and/or merchant system 108 via network 110 and/or communicating information to issuer system 104, user device 106, and/or merchant system 108 via network 110. For example, transaction service provider system 102 may include a computing device, such as a server (e.g., a transaction processing server), a group of servers, and/or other like devices. In some non-limiting embodiments, transaction service provider system 102 may be associated with a transaction service provider as described herein. In some non-limiting embodiments, transaction service provider system 102 may be in communication with a data storage device, which may be local or remote to the transaction service provider system 102. In some non-limiting embodiments, transaction service provider system 102 may be capable of receiving information from, storing information in, communicating information to, or searching information stored in a data storage device.

Issuer system 104 may include one or more devices capable of receiving information from transaction service provider system 102 and/or user device 106 via a network (e.g., network 110) and/or communicating information to transaction service provider system 102, user device 106, and/or merchant system 108 via the network. For example, issuer system 104 may include a computing device, such as a server, a group of servers, and/or other like devices. In some non-limiting embodiments, issuer system 104 may be associated with an issuer institution as described herein. For example, issuer system 104 may be associated with an issuer institution that issued a credit account, debit account, credit card, debit card, and/or the like to a user associated with user device 106.

User device 106 may include one or more devices capable of receiving information from and/or communicating information to transaction service provider system 102, issuer system 104, and/or merchant system 108, via network 110. For example, user device 106 may include a client device and/or the like. In some non-limiting embodiments, user device 106 may or may not be capable of receiving information (e.g., from merchant system 108) via a short range wireless communication connection (e.g., an NFC communication connection, an RFID communication connection, a Bluetooth® communication connection, and/or the like) and/or communicating information (e.g., to merchant system 108) via a short range wireless communication connection. In some non-limiting embodiments, user device 106 may include or be capable of receiving information from and/or communicating information with a container that is configured to record and communicate data associated contents of the container. For example, user device may include or be capable of receiving information from and/or communicating information with a smart container that includes one or more sensors (e.g., one or more temperature sensors, one or more volume sensors, one or more mass sensors, one or more infrared sensors, and/or the like) that record and communicate data associated contents of the smart container.

Merchant system 108 may include one or more devices capable of receiving information from transaction service provider system 102, issuer system 104, and/or user device 106 via network 110 and/or communicating information to transaction service provider system 102, issuer system 104, and/or user device 106 via network 110. Merchant system 108 may also include a device capable of receiving information from user device 106 via network 110, a communication connection (e.g., an NFC communication connection, an RFID communication connection, a Bluetooth® communication connection, and/or the like) with user device 106, and/or the like, and/or communicating information to user device 106 via the network, the communication connection, and/or the like. For example, merchant system 108 may include a computing device, such as a server, a group of servers, a client device, a group of client devices, and/or other like devices. In some non-limiting embodiments, merchant system 108 may be associated with a merchant as described herein. In some non-limiting embodiments, merchant system 108 may include one or more user devices 106. For example, merchant system 108 may include user device 106 that allows a merchant to communicate information to transaction service provider system 102. In some non-limiting embodiments, merchant system 108 may include one or more devices, such as computers, computer systems, and/or peripheral devices capable of being used by a merchant to conduct a payment transaction with a user. For example, merchant system 108 may include a POS device and/or a POS system.

Network 110 may include one or more wired and/or wireless networks. For example, network 110 may include a cellular network (e.g., a long-term evolution (LTE) network, a third generation (3G) network, a fourth generation (4G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 1 are provided as an example. There may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of environment 100 may perform one or more functions described as being performed by another set of devices of environment 100.

Figure 2:
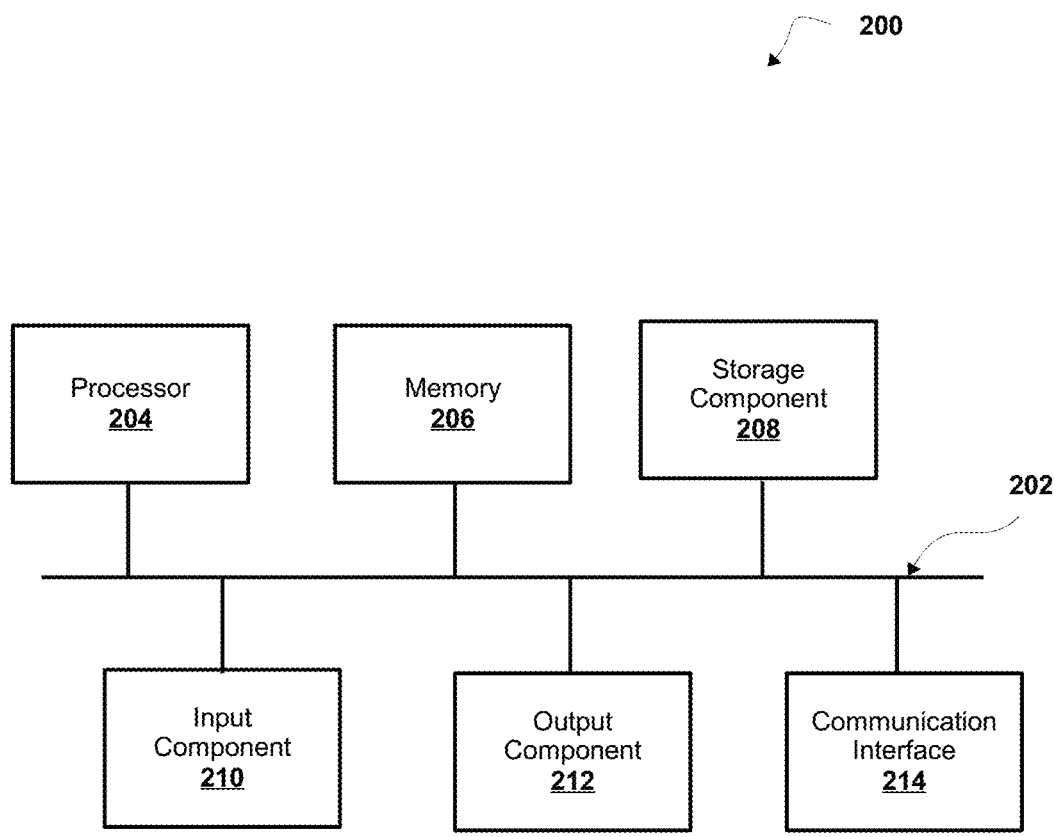
FIG. 2 is a diagram of some non-limiting embodiments of components of one or more devices of FIG. 1.

Referring now to FIG. 2, FIG. 2 is a diagram of example components of a device 200. Device 200 may correspond to transaction service provider system 102, and/or one or more devices of issuer system 104, user device 106, and/or merchant system 108. In some non-limiting embodiments, transaction service provider system 102, issuer system 104, user device 106, and/or merchant system 108 may include at least one device 200 and/or at least one component of device

200. As shown in FIG. 2, device 200 may include a bus 202, a processor 204, memory 206, a storage component 208, an input component 210, an output component 212, and a communication interface 214.

Bus 202 may include a component that permits communication among the components of device 200. In some non-limiting embodiments, processor 204 may be implemented in hardware, firmware, or a combination of hardware and software. For example, processor 204 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 206 may include random access memory (RAM), read only memory (ROM), and/or another type of dynamic or static storage device (e.g., flash memory, magnetic memory, optical memory, etc.) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touch screen display, a keyboard, a keypad, a mouse, a button, a switch, a microphone, etc.). Additionally or alternatively, input component 210 may include a sensor for sensing information (e.g., a global positioning system (GPS) component, an accelerometer, a gyroscope, an actuator, etc.). Output component 212 may include a component that provides output information from device 200 (e.g., a display, a speaker, one or more light-emitting diodes (LEDs), etc.).

Communication interface 214 may include a transceiver-like component (e.g., a transceiver, a separate receiver and transmitter, etc.) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally or alternatively, hardwired circuitry may be used in place of or in combination with software instructions to perform one or more processes described herein. Thus, embodiments described herein are not limited to any specific combination of hardware circuitry and software.

The number and arrangement of components shown in FIG. 2 are provided as an example. In some non-limiting embodiments, device 200 may include additional components, fewer components, different components, or differently arranged components than those shown in FIG. 2. Additionally or alternatively, a set of components (e.g., one or more components) of device 200 may perform one or more functions described as being performed by another set of components of device 200.

Figure 3:
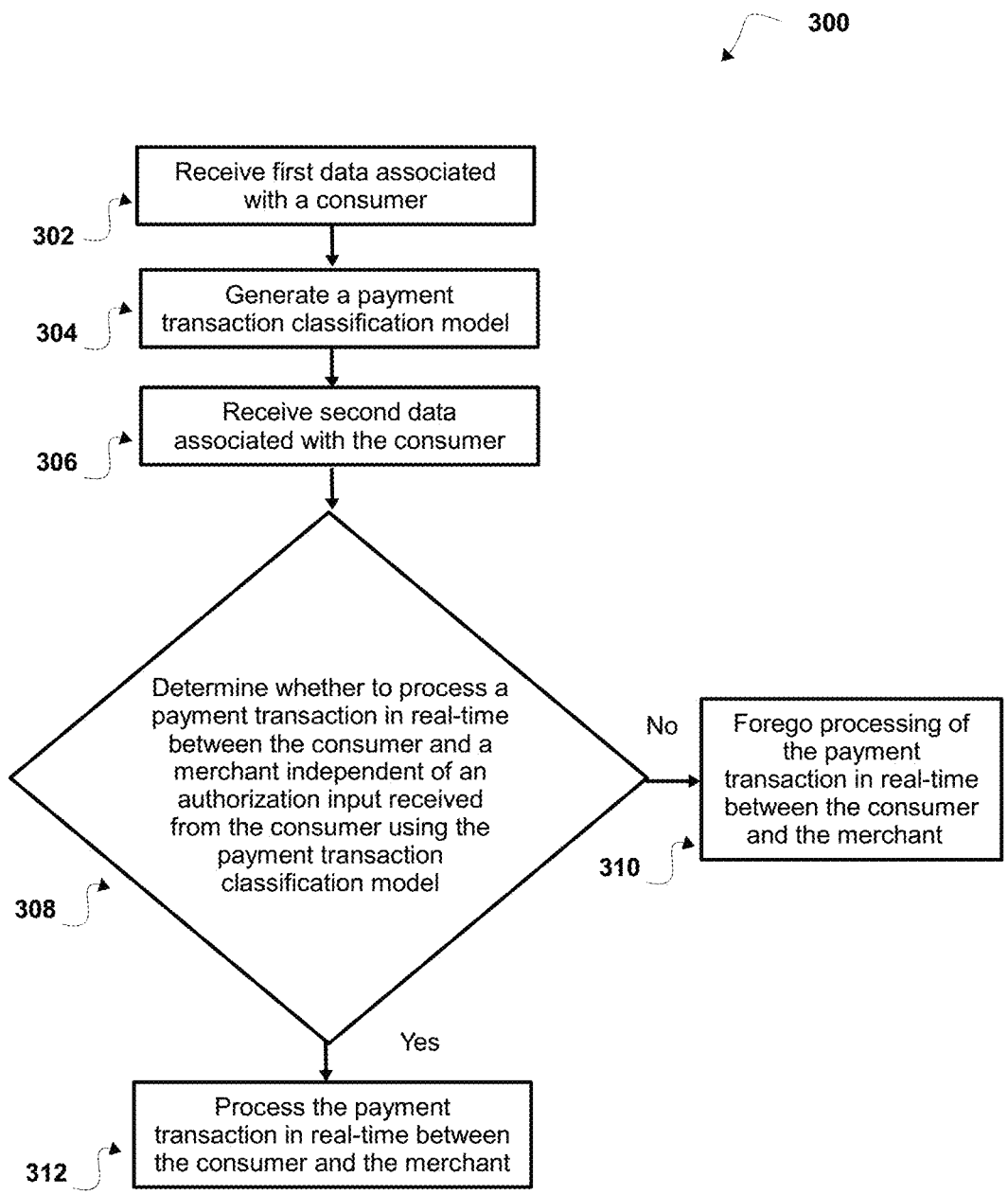
FIG. 3 is a flowchart of some non-limiting embodiments of a process for real-time automatic authorization of a payment transaction that is independent of an authorization input from a consumer.

Referring now to FIG. 3, FIG. 3 is a flowchart of some non-limiting embodiments of a process 300 for real-time automatic authorization of a payment transaction that is independent of an authorization input from a consumer. In some non-limiting embodiments, one or more of the steps of process 300 may be performed (e.g., completely, partially, etc.) by transaction service provider system 102 (e.g., one or more devices of transaction service provider system 102). In some non-limiting embodiments, one or more of the steps of process 300 may be performed (e.g., completely, partially, etc.) by another device or a group of devices separate from or including transaction service provider system 102, such as issuer system 104 (e.g., one or more devices of issuer system 104), user device 106, or merchant system 108 (e.g., one or more devices of merchant system 108).

As shown in FIG. 3, at step 302, process 300 includes receiving first data associated with a consumer. For example, transaction service provider system 102 may receive the first data associated with the consumer. In some non-limiting embodiments, the first data associated with the consumer may include transaction data associated with a plurality of payment transactions (e.g., data associated with a plurality of payment transactions conducted by the consumer). Additionally or alternatively, the first data may include biometric data associated with a plurality of biometric measurements of the consumer (e.g., data associated with a plurality of blood sugar level measurements of the consumer, data associated with a plurality of heart rate measurements of the consumer, and/or the like). Additionally or alternatively, the first data may include smart container data associated with contents of a smart container of the consumer (e.g., data associated with contents of a smart container, data associated with an amount of contents of a smart container, data associated with a volume of contents of a smart container, data associated with an expiration date of contents of a smart container, data associated with an average consumption of contents of the smart container, and/or the like). Additionally or alternatively, the first data may include schedule data associated with a schedule of the consumer (e.g., data associated with a calendar of events of the consumer, data associated with a calendar of future events of the consumer, data associated with a calendar of past events of the consumer, and/or the like). Additionally or alternatively, the first data may include location data associated with a location of the consumer (e.g., data associated with a location of a user device associated with the consumer, data associated with a GPS location of a user device associated with the consumer, data associated with a real-time GPS location of a user device associated with the consumer, data associated with a predicted location of a user device associated with the consumer at a time interval in the future, and/or the like). In some non-limiting embodiments, the first data may be associated with one or more time intervals (e.g., a distinct measure of time or the physical or temporal distance between two things, one or more time periods, and/or the like). For example, the first data may include transaction data associated with a plurality of payment transactions conducted during one or more time intervals, biometric data associated with a plurality of biometric measurements of the consumer during one or more time intervals, smart container data associated with contents of a smart container of the consumer during one or more time intervals, schedule data associated with a schedule of the consumer during one or more intervals, and/or location data associated with a location of the consumer during one or more time intervals.

In some non-limiting embodiments, the transaction data associated with a plurality of payment transactions conducted during one or more time intervals, the biometric data associated with a plurality of biometric measurements of the consumer during one or more time intervals, the smart container data associated with contents of a smart container of the consumer during one or more time intervals, the schedule data associated with a schedule of the consumer during one or more intervals, and/or the location data associated with a location of the consumer during one or more time intervals may be associated with the same or different time intervals.

In some non-limiting embodiments, the first data may include transaction data (e.g., historical transaction data, first transaction data, first historical transaction data, and/or the like) associated with a plurality of payment transactions involving (e.g., conducted by) a consumer, a plurality of consumers that are similar to a consumer, and/or the like. In some non-limiting embodiments, the transaction data may be associated with a plurality of payment transactions involving one or more accounts (e.g., a credit card account, a debit card account, and/or the like) of a consumer, a plurality of accounts of a plurality of consumer similar to a consumer, and/or the like.

In some non-limiting embodiments, the first data associated with the consumer may include transaction data associated with a plurality of payment transactions conducted by the consumer and biometric data associated with a plurality of biometric measurements of the consumer. For example, the first data may include transaction data associated with the plurality of payment transactions conducted by the consumer and blood sugar level data associated with a plurality of blood sugar level measurements of the consumer where each of blood sugar level measurements is taken at a time interval associated with each payment transaction of the plurality of payment transactions. In some non-limiting embodiments, the first data associated with the consumer may include smart container data associated with contents of a smart container of the consumer and schedule data associated with a schedule of the consumer. For example, the first data may include data associated with an amount of contents of a smart container at a time interval and schedule data associated with a schedule of the consumer during the time interval.

In some non-limiting embodiments, transaction service provider system 102 may receive the first data from issuer system 104, user device 106, and/or merchant system 108 (e.g., via network 110). For example, transaction service provider system 102 may receive the transaction data associated with a plurality of payment transactions conducted by the consumer from issuer system 104 and/or merchant system 108 (e.g., via network 110). Transaction service provider system 102 may receive the transaction data from merchant system 108 via network 110 in real-time while a payment transaction is being conducted, after a payment transaction has been authorized, after a payment transaction has been cleared, and/or after a payment transaction has been settled. In some non-limiting embodiments, historical transaction data may include transaction data associated with one or more payment transactions that have been authorized, cleared, and/or settled.

In some non-limiting embodiments, the transaction data may be associated with a payment transaction (e.g., a payment transaction of a plurality of payment transactions) and/or a plurality of payment transactions. For example, the transaction data may be associated with a payment transaction involving a user and a merchant (e.g., a merchant associated with merchant system 108). In some non-limiting embodiments, the plurality of payment transactions may involve a plurality of users and a plurality of merchants, and each payment transaction of the plurality of payment transactions may involve a single user and a single merchant.

In some non-limiting embodiments, the transaction data associated with a payment transaction may include transaction amount data associated with an amount of the payment transaction (e.g., a cost associated with the payment transaction, a transaction amount, an overall transaction amount, a cost of one or more products involved in the payment transaction, and/or the like), transaction time data associated with a time interval at which the payment transaction occurred (e.g., a time of day, a day of the week, a day of a month, a month of a year, a predetermined time of day segment such as morning, afternoon, evening, night, and/or the like, a predetermined day of the week segment such as weekday, weekend, and/or the like, a predetermined segment of a year such as first quarter, second quarter, and/or the like), transaction type data associated with a transaction type of the payment transaction (e.g., an online transaction, a card present transaction, a face-to-face transaction, and/or the like), product identification data associated with an identifier of a product (e.g., a name of a product, a code that identifies a product, and/or the like), and/or the like.

Additionally or alternatively, the transaction data may include user transaction data associated with the user involved in the payment transaction, merchant transaction data associated with the merchant involved in the payment transaction, and/or issuer institution transaction data associated with an issuer institution of an account involved in the payment transaction. In some embodiments, user transaction data may include user identity data associated with an identity of the user (e.g., a unique identifier of the user, a name of the user, and/or the like), user account data associated with an account of the user (e.g., an account identifier associated with the user, a PAN associated with a credit and/or debit account of the user, a token associated with a credit and/or debit account of the user, and/or the like), and/or the like.

In some embodiments, merchant transaction data may include merchant identity data associated with an identity of the merchant (e.g., a unique identifier of the merchant, a name of the merchant, and/or the like), merchant category data associated with at least one merchant category of the merchant (e.g., a code for a merchant category, a name of a merchant category, a type of a merchant category, and/or the like), merchant account data associated with an account of the merchant (e.g., an account identifier associated with an account of the merchant, a PAN associated with an account of the merchant, a token associated with an account of the merchant, and/or the like), merchant location data associated with a merchant location of the merchant (e.g., a location of a store associated with the merchant, a location of a store controlled and operated by the merchant, and/or the like), and/or the like.

In some embodiments, issuer institution transaction data may include issuer institution identity data associated with the issuer institution that issued an account involved in the payment transaction (e.g., a unique identifier of the issuer institution, a name of the issuer institution, an issuer identification number (IIN) associated with the issuer institution, a BIN associated with the issuer institution, and/or the like), and/or the like.

In some non-limiting embodiments, transaction data associated with a payment transaction may identify a time (e.g., a time interval, a predetermined time interval, a time of day, a day, a week, a month, a year, and/or the like) at which the payment transaction occurred. For example, the transaction data associated with the payment transaction may include transaction time data that identifies a time interval at which the payment transaction occurred.

As further shown in FIG. 3, at step 304, process 300 includes generating a payment transaction classification model. For example, transaction service provider system 102 may generate a payment transaction classification model based on the first data associated with the consumer. In some non-limiting embodiments, transaction service provider system 102 may generate the payment transaction classification model based on first data including transaction data associated with a plurality of payment transactions, biometric data associated with a plurality of biometric measurements of the consumer, smart container data associated with contents of a smart container of the consumer, schedule data associated with a schedule of the consumer, and/or location data associated with a location of the consumer.

In some non-limiting embodiments, transaction service provider system 102 may receive the first data from issuer system 104, user device 106, and/or merchant system 108. Transaction service provider system 102 may analyze the first data to generate the payment transaction classification model based on receiving the first data. In some non-limiting embodiments, transaction service provider system 102 may generate the payment transaction classification model by generating a rule for the payment transaction classification model based on the first data (e.g., transaction data associated with a plurality of payment transactions conducted during one or more time intervals, biometric data associated with a plurality of biometric measurements of the consumer during one or more time intervals, smart container data associated with contents of a smart container of the consumer during one or more time intervals, schedule data associated with a schedule of the consumer during one or more intervals, and/or location data associated with a location of the consumer during one or more time intervals) associated with a plurality of payment transactions.

In some non-limiting embodiments, transaction service provider system 102 may process the first data to obtain training data for the payment transaction classification model. For example, transaction service provider system 102 may process the first data to change the first data into a format that may be analyzed (e.g., by transaction service provider system 102) to generate a payment transaction classification model. The first data that is changed may be referred to as training data. In some non-limiting embodiments, transaction service provider system 102 may process the first data to obtain the training data based on receiving the first data. Additionally or alternatively, transaction service provider system 102 may process the first data to obtain the training data based on transaction service provider system 102 receiving an indication that transaction service provider system 102 is to process the first data from a user of transaction service provider system 102, such as when transaction service provider system 102 receives an indication to create a payment transaction classification model for a time interval corresponding to the first data.

In some non-limiting embodiments, transaction service provider system 102 may process the transaction data by determining a first variable based on the first data. A first variable may include a metric, associated with a payment transaction, a biometric measurement of the consumer, contents of a smart container of the consumer, a schedule of the consumer, and/or a location of the consumer. The first variable may be analyzed to generate a payment transaction classification model. In one example, the first variable may include a payment transaction variable associated with a consumer (e.g., an account of a consumer) involved in a payment transaction, such as a payment transaction variable associated with whether an account of the consumer was involved in a payment transaction with a merchant during a time interval.

In some non-limiting embodiments, transaction service provider system 102 may analyze the training data to generate the payment transaction classification model. For example, transaction service provider system 102 may use machine learning techniques to analyze the training data to generate the payment transaction classification model. In some non-limiting embodiments, generating the payment transaction classification model (e.g., based on training data obtained from the first data) may be referred to as training the payment transaction classification model. The machine learning techniques may include, for example, supervised and/or unsupervised techniques, such as decision trees, gradient boosting, logistic regressions, artificial neural networks, Bayesian statistics, learning automata, Hidden Markov Modeling, linear classifiers, quadratic classifiers, association rule learning, or the like. In some non-limiting embodiments, the payment transaction classification model may include a model that is specific to a particular merchant, a particular group of merchants, a particular group of merchants in a predetermined geographical area, and/or the like. Additionally or alternatively, the payment transaction classification model may be specific to a particular consumer. In some non-limiting embodiments, transaction service provider system 102 may generate one or more payment transaction classification models for one or more consumers, a particular group of consumers, and/or a particular group of consumers in a geographical area.

Additionally or alternatively, when analyzing the training data, transaction service provider system 102 may identify one or more first variables (e.g., one or more independent variables) as predictor variables that may be used to make a prediction (e.g., when analyzing the training data). In some non-limiting embodiments, the predictor variables may be one or more variables associated with transaction data regarding one or more payment transactions, biometric data regarding one or more biometric measurements of the consumer, smart container data associated with contents of a smart container of the consumer, schedule data associated with a schedule of the consumer, and/or location data associated with a location of the consumer. In some non-limiting embodiments, values of the predictor variables may be inputs to the payment transaction classification model. For example, transaction service provider system 102 may identify a subset (e.g., a proper subset) of the first variables as predictor variables that may be used to accurately predict whether a user will conduct a payment transaction with a merchant. In some non-limiting embodiments, the predictor variables may include one or more of the first variables, as discussed above, that have a significant impact (e.g., an impact satisfying a threshold) on a probability that the user will conduct a payment transaction with a merchant using an account of the consumer as determined by transaction service provider system 102.

In some non-limiting embodiments, the payment transaction classification model (e.g., a multinomial classification model created by transaction service provider system 102) may be designed to receive, as an input, the first data associated with the consumer, and provide, as an output, a prediction as to whether the consumer is likely to conduct a payment transaction with a merchant. For example, the payment transaction classification model may receive the input and may provide the output that includes a prediction as to whether the consumer will use an account of the consumer to conduct a payment transaction with a specified merchant (e.g., a merchant associated with a merchant category, a merchant with which the consumer has conducted a number of previous payment transactions, and/or the like).

In some non-limiting embodiments, the payment transaction classification model may be designed to receive, as an input, one or more first variables, identified as predictor variables and associated with a consumer (e.g., associated with an account of a consumer, associated with a credit account of a consumer, associated with a debit account of a consumer, and/or the like), and provide, as an output, a prediction (e.g., a probability, a binary output, a yes-no output, a score, a prediction score, and/or the like) that the user will conduct a payment transaction in one or more payment transaction categories of a plurality of payment transaction categories.

In some non-limiting embodiments, transaction service provider system 102 may validate the payment transaction classification model. For example, transaction service provider system 102 may validate the payment transaction classification model after transaction service provider system 102 generates the payment transaction classification model. In some non-limiting embodiments, transaction service provider system 102 may validate the payment transaction classification model based on a portion of the training data to be used for validation. For example, transaction service provider system 102 may partition the training data into a first portion and a second portion, where the first portion may be used to generate the payment transaction classification model, as described above. In this example, the second portion of the training data (e.g., the validation data) may be used to validate the payment transaction classification model.

In some non-limiting embodiments, transaction service provider system 102 may validate the payment transaction classification model by providing validation data associated with a consumer (e.g., transaction data associated with one or more payment transactions involving a consumer) as input to the payment transaction classification model, and determining, based on an output of the payment transaction classification model, whether the payment transaction classification model correctly, or incorrectly, predicted that the consumer will conduct a threshold value of payment transactions involving a merchant using an account of the consumer. In some non-limiting embodiments, transaction service provider system 102 may validate the payment transaction classification model based on a validation threshold. For example, transaction service provider system 102 may be configured to validate the payment transaction classification model when a threshold value (e.g., the validation threshold) of payment transactions involving a merchant using an account of the consumer are correctly predicted by the payment transaction classification model (e.g., when the payment transaction classification model correctly predicts 50% of the payment transactions as being conducted involving the merchant, 70% of the payment transactions as being conducted involving the merchant, a threshold number of the payment transactions as being conducted involving the merchant, and/or the like).

In some non-limiting embodiments, if transaction service provider system 102 does not validate the payment transaction classification model (e.g., when a percentage of correctly predicted payment transactions does not satisfy the validation threshold), then transaction service provider system 102 may generate additional payment transaction classification models.

In some non-limiting embodiments, once the payment transaction classification model has been validated, transaction service provider system 102 may further train the payment transaction classification model and/or create new payment transaction classification models based on receiving new training data. The new training data may include additional first data associated with the consumer. In some non-limiting embodiments, the new training data may include first data relating to a prediction that a user will conduct a threshold value of payment transactions involving a merchant (e.g., a second merchant) that is different from the merchant (e.g., a first merchant) associated with the previous training data. For example, transaction service provider system 102 may use the payment transaction classification model to predict that a user will conduct a payment transaction involving the different merchant using an account of the consumer. In such an example, transaction service provider system 102 may have communicated a notification (e.g., a notification message with a request to conduct a payment transaction involving the different merchant) to the consumer based on the prediction, and despite communicating the notification to the consumer, the user did not conduct a payment transaction with the different merchant (e.g., within a predetermined amount of time of transaction service provider system 102 communicating the notification to the consumer). In such an example, transaction service provider system 102 may update one or more payment transaction classification models based on this new training data.

In some non-limiting embodiments, transaction service provider system 102 may store the payment transaction classification model. For example, transaction service provider system 102 may store the payment transaction classification model in a data structure (e.g., a database, a linked list, a tree, and/or the like). The data structure may be located within transaction service provider system 102 or external, and possibly remote from, transaction service provider system 102.

As further shown in FIG. 3, at step 306, process 300 includes receiving second data associated with the consumer. For example, transaction service provider system 102 may receive second data associated with the consumer. In some non-limiting embodiments, transaction service provider system 102 may receive the second data associated with the consumer in real-time before determining whether to process a payment transaction in real-time between the consumer and the merchant involving an account associated with the consumer.

In some non-limiting embodiments, the second data associated with the consumer is independent of transaction data associated with a payment transaction. For example, the second data associated with the consumer may include data associated with the consumer that is received from user device 106 associated with the consumer where the data associated with the consumer received from user device 106 is independent of transaction data associated with a payment transaction.

In some non-limiting embodiments, the second data may include biometric data associated with a biometric measurement of the consumer (e.g., data associated with a blood sugar level measurement of the consumer, data associated with a heart rate measurement of the consumer, and/or the like). Additionally or alternatively, the second data may include smart container data associated with contents of a smart container of the consumer (e.g., data associated with contents of a smart container, data associated with an amount of contents of a smart container, data associated with a volume of contents of a smart container, data associated with an expiration date of contents of a smart container, and/or the like). Additionally or alternatively, the second data may include schedule data associated with a schedule of the consumer (e.g., data associated with a calendar of events of the consumer, data associated with a calendar of future events of the consumer, data associated with a calendar of past events of the consumer, and/or the like). Additionally or alternatively, the second data may include location data associated with a location of the consumer (e.g., location data associated with a location of a user device associated with the consumer, data associated with a GPS location of a user device associated with the consumer, data associated with a real-time GPS location of a user device associated with the consumer, data associated with a real-time location of a user device associated with the consumer, data associated with a predicted location of a user device associated with the consumer at a time in the future, and/or the like). In some non-limiting embodiments, the second data may be associated with a predetermined time interval. For example, the second data may include biometric data associated with a biometric measurement of the consumer during the predetermined time interval, smart container data associated with contents of a smart container of the consumer during the time interval, schedule data associated with a schedule of the consumer during the predetermined time interval, and/or location data associated with a location of the consumer during the predetermined time interval.

In some non-limiting embodiments, biometric data associated with a plurality of biometric measurements of the consumer may include data associated with a blood sugar level of the consumer. For example, biometric data associated with a plurality of biometric measurements of the consumer may include data associated with a blood sugar level of the consumer where the biometric measurements of the consumer are measured by a user device (e.g., user device 106) associated with the consumer. In some non-limiting embodiments, transaction service provider system 102 may receive data associated with a blood sugar level of the consumer during a time interval from a user device (e.g., user device 106) associated with the consumer.

In some non-limiting embodiments, smart container data associated with the smart container of the consumer may include data associated with an amount of contents of the smart container of the consumer, and transaction service provider system 102 may receive the data associated with an amount of contents of the smart container of the consumer from a user device associated with the smart container (e.g., a smart appliance associated with the smart container) and/or a user device associated with the consumer (e.g., user device 106 associated with the consumer).

As further shown in FIG. 3, at step 308, process 300 includes determining whether to process a payment transaction in real-time between the consumer and a merchant independent of an authorization input received from the consumer using the payment transaction classification model. For example, transaction service provider system 102 may determine whether to process a payment transaction in real-time between the consumer and a merchant (e.g., a merchant associated with merchant system 108) independent of an authorization input (e.g., an input provided by the consumer based on a request for authorization of a payment transaction, an input including an indication that the consumer authorizes or does not authorized a payment transaction provided by the consumer, and/or the like) received from user device 106 associated with the consumer.

In some non-limiting embodiments, transaction service provider system 102 may determine whether to process the payment transaction in real-time between the consumer and the merchant independent of an authorization input received from user device 106 associated with the consumer based on the payment transaction classification model and the second data associated with the consumer. For example, transaction service provider system 102 may provide the second data associated the consumer as an input to the payment transaction classification model and transaction service provider system 102 may receive an output of the payment transaction classification model. The output may include a prediction regarding whether the consumer is likely to conduct a payment transaction with the merchant based on the second data.

In some non-limiting embodiments, transaction service provider system 102 may determine that transaction service provider system 102 is to process the payment transaction in real-time between the consumer and the merchant independent of an authorization input received from user device 106 associated with the consumer based on the payment transaction classification model and the second data associated with the consumer. For example, transaction service provider system 102 may provide the second data associated with the consumer as the input to the payment transaction classification model and may receive the output of the payment transaction classification model. Transaction service provider system 102 may compare the output to a threshold value associated with a prediction that the consumer will conduct a payment transaction with the merchant. If the output of the payment transaction classification model satisfies the threshold value, transaction service provider system 102 may determine that transaction service provider system 102 is to process the payment transaction in real-time between the consumer and the merchant independent of an authorization input received from user device 106 associated with the consumer.

In some non-limiting embodiments, transaction service provider system 102 may determine that transaction service provider system 102 is not to process the payment transaction in real-time between the consumer and the merchant independent of an authorization input received from user device 106 associated with the consumer based on the payment transaction classification model and the second data associated with the consumer. For example, transaction service provider system 102 may provide the second data associated with the consumer as the input to the payment transaction classification model and may receive the output of the payment transaction classification model. Transaction service provider system 102 may compare the output to the threshold value associated with a prediction that the consumer will conduct a payment transaction with the merchant. If the output of the payment transaction classification model does not satisfy the threshold value, transaction service provider system 102 may determine that transaction service provider system 102 is not to process the payment transaction in real-time between the consumer and the merchant independent of an authorization input received from user device 106 associated with the consumer.

In some non-limiting embodiments, transaction service provider system 102 may communicate data associated with the output of the payment transaction classification model to issuer system 104, user device 106, and/or merchant system 108 based on receiving the output of the payment transaction classification model. For example, transaction service provider system 102 may communicate data associated with the output of the payment transaction classification model to issuer system 104, user device 106, and/or merchant system 108 and issuer system 104, user device 106, and/or merchant system 108 may determine whether to process the payment transaction in real-time between the consumer and the merchant independent of an authorization input received from user device 106 associated with the consumer.

In some non-limiting embodiments, transaction service provider system 102 may determine a plurality of prediction scores based on the payment transaction classification model and the second data associated with the consumer. In some non-limiting embodiments, the second data used to determine the plurality of prediction scores may be the same or similar to the first data to generate the payment transaction classification model. In some non-limiting embodiments, the transaction data used to determine the plurality of prediction scores may be associated with a plurality of payment transactions in a plurality of merchant categories conducted during a time interval that is the same as or different from (e.g., before or after) the time interval in which the plurality of payment transactions, which are associated with the transaction data used to generate the payment transaction classification model, was conducted. A prediction score (e.g., each prediction score of the plurality of prediction scores) may include a prediction of whether a consumer will conduct a payment transaction involving a merchant using an account of the consumer.

In some non-limiting embodiments, transaction service provider system 102 may determine that location data associated with a location of the consumer during a time interval satisfies a threshold value of distance associated with a merchant location of a merchant and/or determining that biometric data associated with a biometric measurement of the consumer during a time interval satisfies a threshold value of the biometric measurement of the consumer. For example, transaction service provider system 102 may determine that the location data, which includes an indication of a location of the consumer during a time interval, indicates that the consumer is within a threshold value of distance associated with a merchant location of a merchant and/or determining that the biometric data, which includes an indication of a biometric measurement of the consumer during a time interval, is within a threshold value of the biometric measurement of the consumer. In some non-limiting embodiments, transaction service provider system 102 may determine whether to process the payment transaction in real-time between the consumer and the merchant independent of an authorization input received from the consumer after determining that the location data associated with the location of the consumer during a time interval satisfies the threshold value of distance associated with the merchant location of the merchant and/or determining that the biometric data associated with the biometric measurement of the consumer during a time interval satisfies the threshold value of the biometric measurement of the consumer.

In some non-limiting embodiments, transaction service provider system 102 may determine that smart container data associated with a smart container of the consumer during a predetermined time interval satisfies a threshold value of content associated with a smart container and/or determines that schedule data associated with a schedule of the consumer during a predetermined time interval satisfies a threshold value of a time interval associated with the schedule of the consumer. For example, transaction service provider system 102 may determine that the smart container data, which includes an indication of an amount of contents of the smart container during a predetermined time interval satisfies the threshold value of contents of the smart container and/or determines that the schedule data, which includes an indication that a consumer is to be at a location associated with the consumer, during a predetermined time interval satisfies a threshold value of a time interval associated with the schedule of the consumer (e.g., determine that the consumer is to be at a location associated with the consumer during a predetermined time interval for a time interval that is a threshold value of a time interval specified in the schedule). In some non-limiting embodiments, transaction service provider system 102 may determine whether to process the payment transaction in real-time between the consumer and the merchant independent of an authorization input received from the consumer based on (e.g., before, after) determining that the smart container data associated with a smart container of the consumer during a predetermined time interval satisfies a threshold value of content associated with a smart container and/or determining that schedule data associated with a schedule of the consumer during a predetermined time interval satisfies a threshold value of a time interval associated with the schedule of the consumer.

In some non-limiting embodiments, transaction service provider system 102 may determine an identity of a merchant. For example, transaction service provider system 102 may determine an identity of a merchant associated with a merchant location and/or an identity of the merchant that provides a product associated with a smart container (e.g., a product associated with contents of a smart container). In some non-limiting embodiments, transaction service provider system 102 may communicate an order of a product (e.g., a product provided by the merchant, a product associated with a smart container of the consumer, and/or the like) to the merchant based on determining the identity of the merchant associated with the merchant location. For example, transaction service provider system 102 may determine an identity of the merchant associated with the merchant location and communicate an order of a product to the merchant based on determining that transaction service provider system 102 is to process a payment transaction between the consumer and the merchant independent of an authorization input received from the consumer based on the payment transaction classification model and the second data associated with the consumer. In some non-limiting embodiments, transaction service provider system 102 may communicate the order of the product to the merchant by communicating the order of the product to the merchant during a time interval based on the data associated with a biometric measurement of the consumer during the time interval. In some non-limiting embodiments, transaction service provider system 102 may communicate an order of a product to the merchant during a predetermined time interval (e.g., a predetermined time interval regarding the second data associated with the consumer) based on smart container data associated with a smart container of the consumer.

In some non-limiting embodiments, the second data associated with the consumer during the time interval comprises calendar data associated with a calendar application of the consumer, and transaction service provider system 102 may determine whether to process the payment transaction in real-time between the consumer and the merchant based on determining whether the calendar data associated with the calendar application of the consumer indicates that the consumer is to be within a threshold value of a distance associated with the merchant location during a time interval.

In some non-limiting embodiments, smart container data associated with the smart container of the consumer includes data associated with an average consumption of contents of the smart container and/or data associated with an amount of contents associated with the smart container of the consumer. In some non-limiting embodiments, transaction service provider system 102 may determine an estimated time interval at which the amount of contents of the smart container satisfy a threshold value associated with the amount of contents of the smart container based on the data associated with an average consumption of contents of the smart container and the data associated with an amount of contents associated with the smart container of the consumer. In some non-limiting embodiments, transaction service provider system 102 may determine whether to process the payment transaction in real-time between the consumer and the merchant independent of an authorization input received from the consumer based on the estimated time interval at which the contents of the smart container of the consumer satisfy the threshold value associated with the amount of contents of the smart container.

As further shown in FIG. 3, at step 310, process 300 includes foregoing processing of the payment transaction in real-time between the consumer and the merchant independent of an authorization input received from the consumer. For example, transaction service provider system 102 may forego processing a payment transaction in real-time between the consumer and the merchant independent of an authorization input received from the consumer based on transaction service provider system 102 determining not to process the payment transaction in real-time between the consumer and the merchant. In some non-limiting embodiments, transaction service provider system 102 may determine not to communicate an authorization message that includes an indication that the payment transaction is authorized by the consumer associated with user device 106.

As further shown in FIG. 3, at step 312, process 300 includes processing the payment transaction in real-time between the consumer and the merchant independent of an authorization input received from the consumer. For example, transaction service provider system 102 may process a payment transaction in real-time between the consumer and the merchant independent of an authorization input received from the consumer based on transaction service provider system 102 determining to process the payment transaction in real-time between the consumer and the merchant.

In some non-limiting embodiments, transaction service provider system 102 may determine an identity of a merchant associated with a merchant location and communicate an order of a product to the merchant based on determining the identity of the merchant associated with the merchant location. For example, transaction service provider system 102 may determine an identity of the merchant associated with the merchant location and communicate an order of a product to the merchant based on determining the identity of the merchant associated with the merchant location based on processing of a payment transaction between the consumer and the merchant independent of an authorization input received from the consumer.

In some non-limiting embodiments, transaction service provider system 102 may determine a distance of the consumer from a merchant location of the merchant and determine an estimated time of arrival of the consumer at the merchant location based on the distance of the consumer from the merchant location. For example, transaction service provider system 102 may determine a distance of the consumer from a merchant location of the merchant based on second data received from a user device (e.g., user device 106) associated with the consumer and determine an estimated time of arrival of the consumer at the merchant location based on the distance of the consumer from the merchant location. In some non-limiting embodiments, transaction service provider system 102 may process a payment transaction between the consumer and the merchant associated with the merchant location based on the estimated time of arrival of the consumer at the merchant location.

In some non-limiting embodiments, transaction service provider system 102 may determine an amount of time between a predetermined time interval and a future time interval associated with the consumer and determine whether the consumer is to be present at a location associated with the smart container based on the schedule data associated with the schedule of the consumer during the predetermined time interval. In some non-limiting embodiments, transaction service provider system 102 may process a payment transaction in real-time between the consumer and the merchant associated with the merchant location based on determining that the consumer is to be present at the location associated with the smart container during the amount of time between the predetermined time interval and the future time interval associated with the consumer.

Figure 4A:
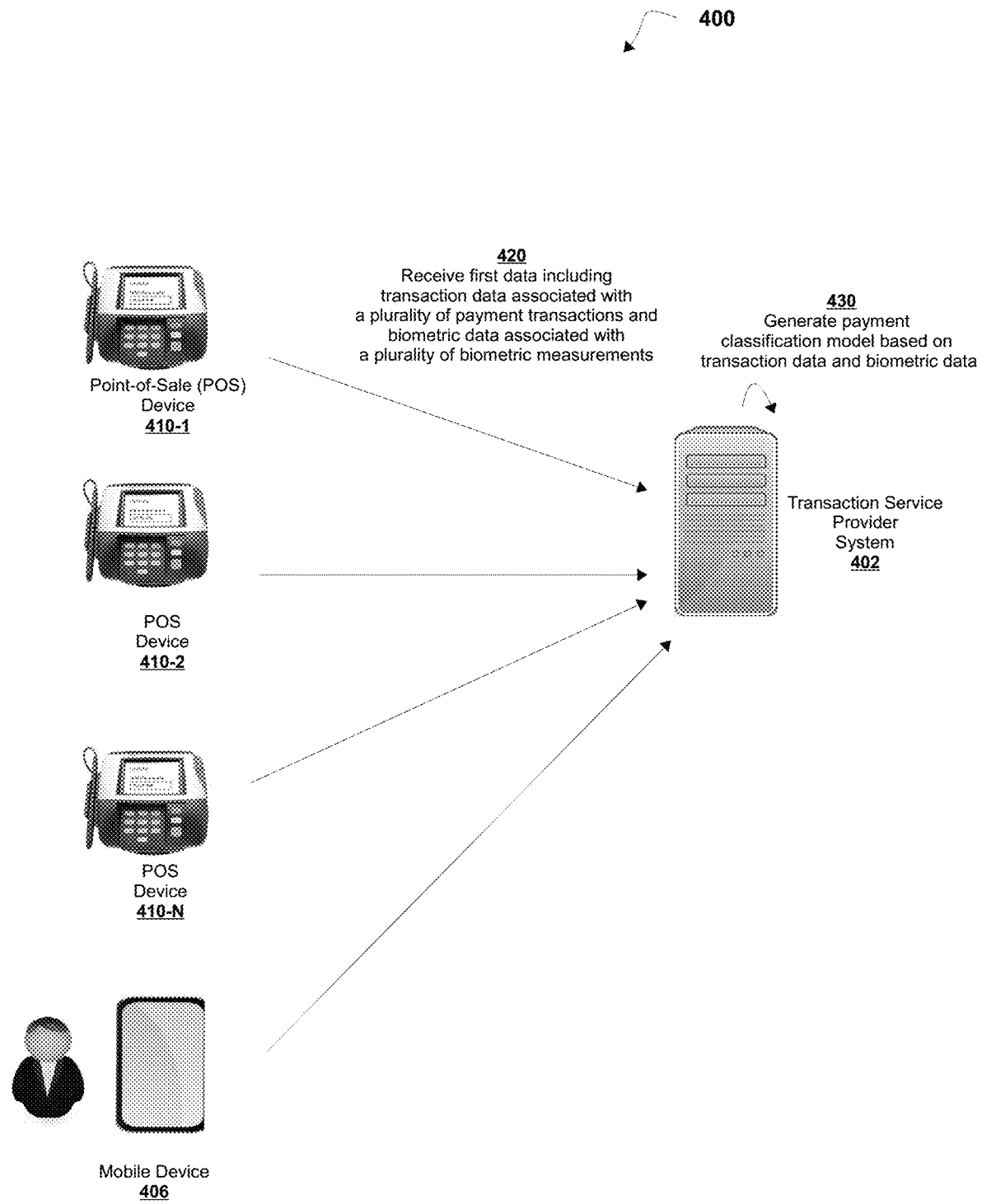
FIGS. 4A-4B are diagrams of an implementation of some non-limiting embodiments of the process shown in FIG. 3.
Figure 4B:
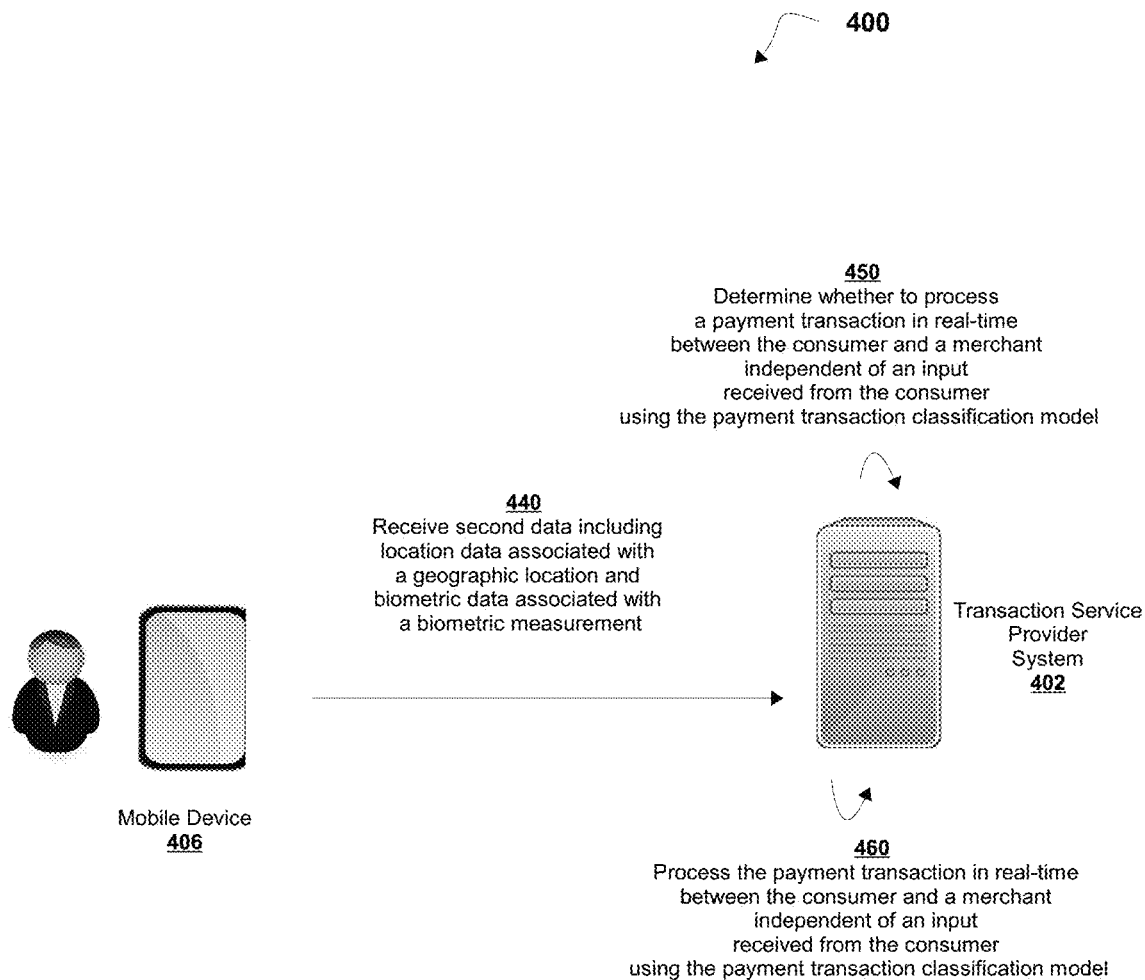

FIGS. 4A and 4B are diagrams of an overview of some non-limiting embodiments of implementation 400 relating to process 300 shown in FIG. 3. As shown in FIGS. 4A and 4B, implementation 400 may include transaction service provider system 402, mobile device 406, and one or more POS devices 410-1 through 410-N. As referred to herein, one or more of POS devices 410-1 through 410-N may perform the same or similar functions as a POS device described above. Accordingly, POS devices 410-1 through 410-N may be collectively referred to as "POS devices 410." In some non-limiting embodiments, POS devices 410 may be associated with (e.g., components of) one or more merchant systems 108. In some non-limiting embodiments, transaction service provider system 402 may be the same or similar to transaction service provider system 102, and mobile device 406 may be the same as or similar to user device 106 as described above.

As shown by reference number 420 in FIG. 4A, transaction service provider system 402 may receive first data associated with a consumer from POS devices 410 and/or mobile device 406. In some non-limiting embodiments, the first data may include transaction data associated with a plurality of payment transactions conducted by the consumer and biometric data associated with a plurality of biometric measurements of the consumer. Each of the biometric measurements may be taken within a predetermined time interval associated with each payment transaction of the plurality of payment transactions.

As further shown by reference number 430 in FIG. 4A, transaction service provider system 402 may generate a payment transaction classification model based on the first data. In some non-limiting embodiments, transaction service provider system 402 may generate the payment transaction classification model based on the transaction data associated with a plurality of payment transactions conducted by the consumer and the biometric data associated with the plurality of biometric measurements of the consumer.

As shown by reference number 440 in FIG. 4B, transaction service provider system 402 may receive second data associated with the consumer during a time interval. In some non-limiting embodiments, the second data associated with the consumer may include location data associated with a geographic location of the consumer during the time interval, and biometric data associated with a biometric measurement of the consumer during the time interval.

As further shown by reference number 450 in FIG. 4B, transaction service provider system 402 may determine whether to process a payment transaction in real-time between the consumer and the merchant independent of an input received from the consumer. In some non-limiting embodiments, transaction service provider system 402 may determine whether to process the payment transaction in real-time between the consumer and a merchant using the payment transaction classification model and the second data associated with the consumer.

As further shown by reference number 460 in FIG. 4B, transaction service provider system 402 may process the payment transaction in real-time between the consumer and a merchant based on determining to process the payment transaction in real-time between the consumer and the merchant. In some non-limiting embodiments, transaction service provider system 402 may communicate a notification message to mobile device 406 based on processing the payment transaction in real-time between the consumer and the merchant. For example, transaction service provider system 402 may communicate the notification message to mobile device 406, where the notification message includes an indication that transaction service provider system 402 processed the payment transaction in real-time between the consumer and the merchant independent of an authorization input received from the consumer.

Although the disclosure has been described in detail for the purpose of illustration based on what is currently considered to be the most practical and preferred embodiments, it is to be understood that such detail is solely for that purpose and that the disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:

1. A method, comprising:
    receiving, with at least one processor, first data associated with a consumer, wherein the first data comprises:
        transaction data associated with a plurality of payment transactions, and
        biometric data associated with a plurality of biometric measurements of the consumer, wherein each of the biometric measurements is taken within a predetermined time interval associated with each payment transaction of the plurality of payment transactions;
    generating, with at least one processor, a payment transaction classification model based on the transaction data associated with the plurality of payment transactions and the biometric data associated with the plurality of biometric measurements of the consumer, wherein the payment transaction classification model is configured to provide an output that comprises a prediction as to whether the consumer will use an account of the consumer to conduct a payment transaction with a merchant;
    measuring a metabolic aspect of the consumer during a time interval using a biometric sensor to provide biometric data associated with a biometric measurement of the metabolic aspect of the consumer during the time interval;
    receiving, with at least one processor and in real-time, second data associated with the consumer from a user device associated with the consumer, wherein the second data comprises:
        location data associated with a real-time location of the consumer during a time interval, wherein the location data comprises the real-time location of the user device associated with the consumer based on a global position system (GPS) sensor of the user device; and
        the biometric data associated with the biometric measurement of the metabolic aspect of the consumer during the time interval;
    determining, with at least one processor, that the location data associated with the location of the consumer during the time interval satisfies a threshold value of distance associated with a merchant location of the merchant;
    providing, with at least one processor, the biometric data associated with the biometric measurement of the metabolic aspect of the consumer during the time interval as an input to the payment transaction classification model to generate an output, wherein the output comprises a prediction that the consumer is likely to conduct a payment transaction with the merchant based on the biometric data; and
    processing, with at least one processor, a real-time payment transaction independent of an authorization input received from the consumer based on the output of the payment transaction classification model and based on determining that the location data associated with the real-time location of the consumer during the time interval satisfies the threshold value of distance associated with the merchant location of the merchant.

2. The method of claim 1, further comprising:
    determining that the biometric data associated with the biometric measurement of the metabolic aspect of the consumer during the time interval satisfies a threshold value of the biometric measurement of the metabolic aspect of the consumer.

3. The method of claim 1, wherein the real-time payment transaction comprises a real-time payment transaction between the consumer and the merchant associated with the merchant location, the method further comprising:
    determining an identity of the merchant associated with the merchant location; and
    communicating an order of a product to the merchant based on determining the identity of the merchant associated with the merchant location.

4. The method of claim 3, wherein communicating the order of the product to the merchant comprises:
communicating the order of the product to the merchant during the time interval based on the biometric data associated with the biometric measurement of the metabolic aspect of the consumer during the time interval.

5. The method of claim 1, wherein the transaction data associated with the plurality of payment transactions comprises at least one of the following:
merchant category data associated with a merchant category of a merchant involved in a payment transaction of the plurality of payment transactions conducted by the consumer;
product identification data associated with an identifier of a product involved in a payment transaction of the plurality of payment transactions conducted by the consumer;
location data associated with a merchant location associated with a merchant involved in a payment transaction of the plurality of payment transactions conducted by the consumer; or
any combination thereof.

6. The method of claim 1, further comprising:
determining a distance of the consumer from the merchant location of the merchant; and
determining an estimated time of arrival of the consumer at the merchant location based on the distance of the consumer from the merchant location,
wherein processing the real-time payment transaction independent of an input received from the consumer comprises:
processing the real-time payment transaction based on the estimated time of arrival of the consumer at the merchant location.

7. A system, comprising:
at least one processor programmed or configured to:
receive first data associated with a consumer, wherein the first data comprises:
transaction data associated with a plurality of payment transactions, and
biometric data associated with a plurality of biometric measurements of the consumer, wherein each of the biometric measurements is taken within a predetermined time interval associated with each payment transaction of the plurality of payment transactions;
generate a payment transaction classification model based on the transaction data associated with the plurality of payment transactions and the biometric data associated with the plurality of biometric measurements of the consumer, wherein the payment transaction classification model is configured to provide an output that comprises a prediction as to whether the consumer will use an account of the consumer to conduct a payment transaction with a merchant;
measure a metabolic aspect of the consumer during a time interval using a biometric sensor to provide biometric data associated with a biometric measurement of the metabolic aspect of the consumer during the time interval;
receive, in real-time, second data associated with the consumer from a user device associated with the consumer, wherein the second data comprises:
location data associated with a real-time location of the consumer during a time interval, wherein the location data comprises the real-time location of a user device associated with the consumer based on a global position system (GPS) sensor of the user device; and
the biometric data associated with the biometric measurement of the metabolic aspect of the consumer during the time interval;
determine that the location data associated with the location of the consumer during the time interval satisfies a threshold value of distance associated with a merchant location of the merchant;
provide the biometric data associated with the biometric measurement of the metabolic aspect of the consumer during the time interval as an input to the payment transaction classification model to generate an output, wherein the output comprises a prediction that the consumer is likely to conduct a payment transaction with the merchant based on the biometric data; and
process a real-time payment transaction independent of an authorization input received from the consumer based on the output of the payment transaction classification model and based on determining that the location data associated with the real-time location of the consumer during the time interval satisfies the threshold value of distance associated with the merchant location of the merchant.

8. The system of claim 7, wherein the transaction data associated with the plurality of payment transactions comprises at least one of the following:
merchant category data associated with a merchant category of a merchant involved in a payment transaction of the plurality of payment transactions conducted by the consumer;
product identification data associated with an identifier of a product involved in a payment transaction of the plurality of payment transactions conducted by the consumer;
location data associated with a merchant location associated with a merchant involved in a payment transaction of the plurality of payment transactions conducted by the consumer; or
any combination thereof.

9. The system of claim 7, wherein the at least one processor is further programmed or configured to:
determine that the biometric data associated with the biometric measurement of the metabolic aspect of the consumer during the time interval satisfies a threshold value of the biometric measurement of the metabolic aspect of the consumer.

10. The system of claim 7, wherein the real-time payment transaction comprises a real-time payment transaction between the consumer and the merchant associated with the merchant location, and wherein the at least one processor is further programmed or configured to:
determine an identity of the merchant associated with the merchant location; and
communicate an order of a product to the merchant during the time interval based on determining the identity of the merchant associated with the merchant location.

11. The system of claim 10, wherein, when communicating the order of the product to the merchant during the time interval, the at least one processor is programmed or configured to:
communicate an order of a product to the merchant during the time interval based on the biometric data associated with the biometric measurement of the metabolic aspect of the consumer during the time interval.

12. The system of claim 7, wherein the at least one processor is further programmed or configured to:
- determine a distance of the consumer from the merchant location of the merchant; and
- determine an estimated time of arrival of the consumer at the merchant location based on the distance of the consumer from the merchant location, and
- wherein, when processing the real-time payment transaction, the at least one processor is programmed or configured to:
  - process the real-time payment transaction in real-time based on the estimated time of arrival of the consumer at the merchant location.

13. The system of claim 7, wherein the second data associated with the consumer comprises calendar data associated with a calendar application of the consumer during a time interval, and wherein the at least one processor is further programmed or configured to:
- determine whether the calendar data associated with the calendar application of the consumer indicates that the consumer is to be within a threshold value of distance of the merchant location of the merchant during the time interval.

14. A computer program product comprising at least one non-transitory computer-readable medium including one or more instructions that, when executed by at least one processor, cause the at least one processor to:
- receive first data associated with a consumer, wherein the first data comprises:
  - transaction data associated with a plurality of payment transactions, and
  - biometric data associated with a plurality of biometric measurements of the consumer, wherein each of the biometric measurements is taken within a predetermined time interval associated with each payment transaction of the plurality of payment transactions;
- generate a payment transaction classification model based on the transaction data associated with the plurality of payment transactions and the biometric data associated with the plurality of biometric measurements of the consumer, wherein the payment transaction classification model is configured to provide an output that comprises a prediction as to whether the consumer will use an account of the consumer to conduct a payment transaction with a merchant;
- measure a metabolic aspect of the consumer during a time interval using a biometric sensor to provide biometric data associated with a biometric measurement of the metabolic aspect of the consumer during the time interval;
- receive, in real-time, second data associated with the consumer from a user device associated with the consumer, wherein the second data comprises:
  - location data associated with a real-time location of the consumer during a time interval, wherein the location data comprises the real-time location of a user device associated with the consumer based on a global position system (GPS) sensor of the user device; and
  - the biometric data associated with the biometric measurement of the metabolic aspect of the consumer during the time interval;
- determine that the location data associated with the location of the consumer during the time interval satisfies a threshold value of distance associated with a merchant location of the merchant;
- provide the biometric data associated with the biometric measurement of the metabolic aspect of the consumer during the time interval as an input to the payment transaction classification model to generate an output, wherein the output comprises a prediction that the consumer is likely to conduct a payment transaction with the merchant based on the biometric data; and
- process a real-time payment transaction independent of an authorization input received from the consumer based on the output of the payment transaction classification model and based on determining that the location data associated with the real-time location of the consumer during the time interval satisfies the threshold value of distance associated with the merchant location of the merchant.

15. The computer program product of claim 14, wherein the one or more instructions further cause the at least one processor to:
- determine that the biometric data associated with the biometric measurement of the metabolic aspect of the consumer during the time interval satisfies a threshold value of the biometric measurement of the metabolic aspect of the consumer.

16. The computer program product of claim 14, wherein the real-time payment transaction comprises the real-time payment transaction between the consumer and the merchant associated with the merchant location, and wherein the one or more instructions further cause the at least one processor to:
- determine an identity of the merchant; and
- communicate an order of a product to the merchant during the time interval based on the biometric data associated with the biometric measurement of the metabolic aspect of the consumer during the time interval.

17. The computer program product of claim 14, wherein the one or more instructions further cause the at least one processor to:
- determine a distance of the consumer from the merchant location of the merchant;
- determine an estimated time of arrival of the consumer at the merchant location based on the distance of the consumer from the merchant location, and
- wherein, the one or more instructions that cause the at least one processor to process the real-time payment transaction, cause the at least one processor to:
  - process the real-time payment transaction based on the estimated time of arrival of the consumer at the merchant location.

\* \* \* \* \*